US007835251B2

(12) United States Patent
Ohyama

(10) Patent No.: US 7,835,251 B2
(45) Date of Patent: Nov. 16, 2010

(54) OPTICAL DEVICE AND OPTICAL PICKUP DEVICE

(75) Inventor: Minoru Ohyama, Kanagawa-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 487 days.

(21) Appl. No.: 10/589,622

(22) PCT Filed: Jan. 25, 2005

(86) PCT No.: PCT/JP2005/000914

§ 371 (c)(1),
(2), (4) Date: Aug. 16, 2006

(87) PCT Pub. No.: WO2005/081238

PCT Pub. Date: Sep. 1, 2005

(65) Prior Publication Data
US 2007/0188835 A1 Aug. 16, 2007

(30) Foreign Application Priority Data
Feb. 20, 2004 (JP) ............... P2004-044510

(51) Int. Cl.
G11B 7/00 (2006.01)
(52) U.S. Cl. .................. 369/112.1; 369/44.41
(58) Field of Classification Search ............. 369/44.41, 369/112.1, 112.15, 112.11, 112.12
See application file for complete search history.

(56) References Cited
U.S. PATENT DOCUMENTS
5,764,606 A * 6/1998 Fukumoto et al. ........ 369/44.41

| 6,556,533 | B1 * | 4/2003 | Fukakusa et al. ....... 369/112.19 |
| 6,809,996 | B2 * | 10/2004 | Shibuya ................... 369/44.37 |
| 7,079,474 | B2 * | 7/2006 | Takahashi ................ 369/120 |
| 2001/0053110 | A1 * | 12/2001 | Shibuya ................... 369/44.23 |
| 2002/0093893 | A1 * | 7/2002 | Matsuda .................. 369/44.41 |

FOREIGN PATENT DOCUMENTS

| JP | 7-6375 | | 1/1995 |
| JP | 08185635 A | * | 7/1996 |
| JP | 9-251650 | | 9/1997 |
| JP | 11-25480 | | 1/1999 |
| JP | 11-73658 | | 3/1999 |

(Continued)

Primary Examiner—Brian E Miller
Assistant Examiner—Mark L Fischer
(74) Attorney, Agent, or Firm—The Nath Law Group; Jerald L. Meyer; Robert T. Burns

(57) ABSTRACT

An optical device diffracts incident light with a hologram element and receives the diffracted light with light receiving faces 20A to 29 on a light receiving element. Reflected sub-beams used for a tracking operation are received with different ones of the light receiving faces depending on the wavelengths of the reflected sub-beams. When first light receiving faces 22, 23, 26, and 27 are receiving an incident beam of a first wavelength, output signals from the first light receiving faces and output signals from the other light receiving faces 24, 25, 28, and 29 are processed to detect an unnecessary light component. The optical device can record and/or reproduce information signals to and/or from optical discs such as DVDs and CDs which need light sources of different wavelengths, without the influence of unnecessary reflected light from the optical discs or without complicating operation of output signals.

9 Claims, 13 Drawing Sheets

FOREIGN PATENT DOCUMENTS

| | | |
|---|---|---|
| JP | 2000-3523 | 1/2000 |
| JP | 2000-228019 | 8/2000 |
| JP | 2001-202647 | 7/2001 |
| JP | 2002-92902 | 3/2002 |
| JP | 2002-109759 | 4/2002 |
| JP | 2003-151169 | 5/2003 |

* cited by examiner (a)

(b)

(a)

(b)

(a)

PROPER REFLECTED LIGHT FROM DISC

UNNECESSARY LIGHT (REFLECTION FROM NON-OBJECTIVE LAYER, FLAR, ETC.)

(b)

(c)

(a)

(b)

OPTICAL DEVICE AND OPTICAL PICKUP DEVICE

TECHNICAL FIELD

The present invention relates to an optical device used for an optical pickup apparatus for recording and reproducing information to and from an information recording medium such as an optical disc, as well as to an optical pickup apparatus employing such an optical device.

BACKGROUND TECHNOLOGY

Various optical discs serving as information recording media have been proposed. Among the optical discs, optical discs of DVD (Digital Versatile Disc) standard whose recording capacity is about seven times as large as optical discs of CD (Compact Disc) standard have rapidly spread in recent years. DVD-Video discs that contain video signals on DVD discs are mass-producible through duplication, and therefore, are widely used as distribution and rental media in place of VHS (registered trade name) video tapes and the like.

Other optical disc standards such as DVD-RAM, DVD-R, DVD-RW, +R, and +RW standards that allow users to record information signals are also rapidly spreading for media used with personal computers (PCs) and video recorders.

For CD-standard optical discs, there are popular standards such as CD-R that allow users to record information signals on the discs.

Optical disc recorders are required to have a function of recording information signals on DVD-standard optical discs with a light source of 650-nm band, as well as on CD-standard optical discs with a light source of 780-nm band. As mentioned above, there are a variety of standards for DVD-standard optical discs, and there is a need to cope with these standards to write and read the discs. To meet the need, several optical pickup apparatuses have been proposed.

Optical pickup apparatuses capable of recording and reproducing data to and from optical discs of various standards have complicated functions and structures, and therefore, are difficult to manufacture. For such optical pickup apparatuses, in particular, for consumer optical pickup apparatuses, there are increasing requirements of performing multiple functions, simplifying structures, reducing size and weight, minimizing manufacturing processes, and lowering costs.

To meet the requirements, various optical pickup apparatuses that are compact, light weight, and capable of reproducing or recording/reproducing CD- and DVD-standard optical discs have been proposed.

An example of one of such optical pickup apparatuses is shown in FIG. 1. This apparatus has been proposed by the inventor of the present invention. In FIG. 1, the optical pickup apparatus has a first laser source 101 to emit laser light of first wavelength and an optical device 102 that incorporates a second laser source to emit laser light of second wavelength. In FIG. 2, the optical device 102 integrally has the second laser source 103, a hologram element 104, and a light receiving element 105. In FIG. 3, the light receiving element 105 has light receiving parts 106 each divided into a plurality of light receiving regions.

In the optical pickup apparatus, laser light of each wavelength produces three beams, which are emitted to a recording track 201a on an optical disc 201. Reflected beams from the optical disc 201 are diffracted by two divided regions of the hologram element 104 as shown in FIG. 2 and are received by predetermined ones of the light receiving regions of the light receiving element 105. At this time, reflected beams of the first and second wavelengths are received by the same light receiving regions.

In the optical pickup apparatus, the light receiving regions of the light receiving element 105 separately provide light detected outputs from which information signals and error signals related to the optical disc are obtained.

DISCLOSURE OF THE INVENTION

Problems of the above-mentioned optical pickup apparatus will be explained.

An objective lens used for both the CD- and DVD-standard optical discs condenses laser light on an optical disc. The condensed laser light includes a component condensed to a spot as well as a flare component caused by diffraction of the objective lens. The flare component is reflected by the optical disc and widely irradiates the light receiving element. The reflected flare component is detected as a DC component added to information and error signals read from the optical disc, to deteriorate signal modulation levels and cause an offset in the error signal.

When reproducing a DVD-standard optical disc having two recording layers, laser light emitted to the optical disc is reflected by a first recording layer which is a reproducing object as well as by a second recording layer. The reflected light from the second recording layer is returned as unnecessary reflected light to the light receiving element. The reflected light from the recording layer that is not a reproducing object is greatly defocused and widened on the light receiving element and has light quantity equivalent to that of reflected light from the objective recording layer. The unnecessary reflected light is detected as a DC component added to information and error signals read from the optical disc, to deteriorate signal modulation levels and cause an offset in the error signal.

An optical pickup apparatus for recording information signals on an optical disc must generate three beams if the apparatus is based on a so-called three-beam method or a DPP method. At this time, the apparatus secures recording light power by increasing the light quantity ratio of a main beam to sub-beams to, for example, 15:1 up to 20:1. Adjacent light receiving regions to receive reflection of the three beams have a risk that diffused light of the reflected main beam may spread over the light receiving regions that must receive the reflected sub-beams. Since the light quantity of the main beam is about 15 to 20 times larger than that of the sub-beams, the light quantity of the diffused light of the reflected main beam gives an unignorable influence on the light receiving regions that must receive the reflected weak sub-beams. The diffused light of the reflected main beam is detected as a DC component added to information and error signals read from the optical disc, to deteriorate signal modulation levels, cause an offset in the error signal, and degrade the dynamic range of an operation circuit.

The above-mentioned optical device employs the same hologram element to diffract reflected beams having different wavelengths including a wavelength for a CD-standard optical disc and a wavelength for a DVD-standard optical disc. Due to the wavelength dependence of a diffraction angle, the reflected beams reach different positions on the light receiving element. To receive reflected beams having different wavelengths with the same light receiving region, each light receiving region of the light receiving element must have a large area. Enlarging the area of each light receiving region, however, results in proportionally increasing the quantity of unnecessary reflected light, to thereby deteriorate signal modulation levels, cause an offset in an error signal, and degrade the dynamic range of an operation circuit.

To avoid the problem, the light receiving region may be divided depending on wavelengths. Dividing the light receiving region may halve the unnecessary light components but it is unable to completely eliminate them.

Japanese Unexamined Patent Application Publication No. 11-73658 discloses an optical pickup apparatus having an offset canceling light receiving element. Only for canceling offset, this apparatus needs dividing a hologram element into regions, increasing a light receiving region, and using an exclusive operation circuit, to cause problems of complicating the structure of the apparatus, making the manufacturing of the apparatus more difficult, and increasing the cost of the apparatus.

In consideration of these situations, an object of the present invention is to provide an optical device capable of reproducing or recording/reproducing information signals to and from DVD- and CD-standard optical discs that need light sources of different wavelengths, avoiding an influence of unnecessary reflected light from an optical disc, and simplifying operation to be carried out on output signals. Also provided is an optical pickup apparatus employing such an optical device.

In order to accomplish the objects, the present invention provides an optical device having at least a light receiving element and a hologram element. The hologram element diffracts a plurality of incident beams having different wavelengths. The light receiving element has light receiving regions to receive the diffracted beams. The light receiving element has a plurality of light receiving regions to receive the incident beams of different wavelengths diffracted at different angles through the hologram element. The light receiving regions receive the incident beams of different wavelengths, respectively. The optical device has an operation unit that processes output signals provided from the plurality of light receiving regions. When one of the light receiving regions is receiving an incident beam of one of the wavelengths, the operation unit carries out an operation according to an output signal from the one light receiving region and an output signal from another one of the light receiving regions, to detect an unnecessary light component.

According to the optical device, when one of the light receiving regions is receiving an incident beam of one of the wavelengths, the operation unit carries out an operation according to an output signal from the one light receiving region and an output signal from another one of the light receiving regions, to detect an unnecessary light component and avoid the influence of the unnecessary light component.

According to the present invention, the plurality of light receiving regions have a nearly equal light receiving area.

In the optical device, the plurality of light receiving regions have a nearly equal light receiving area, and therefore, an unnecessary light component can be easily detected.

In the optical device according to the present invention, the wavelength of an incident beam may be one of first and second wavelengths. If a first light receiving region is receiving an incident beam of the first wavelength, the operation unit carries out an operation of (S1-S2) based on an output signal S1 from the first light receiving region and an output signal S2 from a second light receiving region, to detect an unnecessary light component, and if the second light receiving region is receiving an incident beam of the second wavelength, carries out an operation of (S2-S1) based on an output signal S2 from the second light receiving region and an output signal S1 from the first light receiving region, to detect an unnecessary light component.

The optical device inverts the polarity of an operation for detecting an unnecessary light component depending on whether the first light receiving region receives an incident beam of the first wavelength or the second light receiving region receives an incident beam of the second wavelength. An unnecessary light component can be easily detected on an incident beam of any one of the wavelengths.

In the optical device according to the present invention, the wavelength of an incident beam may be one of first and second wavelengths. The optical device includes a wavelength determination unit for determining whether the wavelength of an incident beam is the first wavelength or the second wavelength and a polarity switching unit for inverting the polarity of an output signal from the operation unit according to a result of determination made by the wavelength determination unit. The operation unit carries out an operation of (S1-S2) based on an output signal S1 from a first light receiving region for receiving an incident beam of the first wavelength and an output signal S2 from a second light receiving region for receiving an incident beam of the second wavelength. The polarity switching unit provides a result of the operation of (S1-S2) as a detection signal representative of an unnecessary light component without inverting the polarity of the output signal from the operation unit if the wavelength of the incident beam is the first wavelength, and if the wavelength of the incident beam is the second wavelength, inverts the polarity of the output signal from the operation unit and provides (−1)×(S1−S2) as a detection signal representative of an unnecessary light component.

The optical device inverts the polarity of an output signal from the operation unit depending on whether the first light receiving region receives an incident beam of the first wavelength or the second light receiving region receives an incident beam of the second wavelength. An unnecessary light component can be easily detected on an incident beam of any one of the wavelengths.

In the optical device according to the present invention, at least part of the operation unit, wavelength determination unit, and polarity switching unit is integrally formed on a substrate on which the light receiving element is formed.

In the optical device, at least part of the operation unit, wavelength determination unit, and polarity switching unit is integrally formed on a substrate on which the light receiving element is formed, so that polarity switching is easily carried out according to an operation result and wavelength determination.

In the optical device according to the present invention, incident beams to the optical device include a reflected main beam that has irradiated an information recording medium to read main information from the information recording medium and been reflected by the information recording medium and two reflected sub-beams that have irradiated the information recording medium to conduct a tracking operation of a recording track on the information recording medium and been reflected by the information recording medium. The light receiving element has reflected-main-beam receiving regions to receive reflected main beams of the different wavelengths diffracted at different angles through the hologram element, respectively, and reflected-sub-beam receiving regions to receive reflected sub-beams of the different wavelengths diffracted at different angles through the hologram element, respectively. When one of the reflected-main-beam receiving regions is receiving an incident beam of one of the wavelengths, the operation unit carries out an operation according to an output signal from the one reflected-main-beam receiving region and an output signal from another of the reflected-main-beam receiving regions, and when one of the reflected-sub-beam receiving regions is receiving an incident beam of one of the wavelengths, the operation unit carries out an operation according to an output signal from the one reflected-sub-beam receiving region and an output signal from another of the reflected-sub-beam receiving regions, to thereby detect an unnecessary light component.

The optical device can avoid the influence of unnecessary light on reflected main beams from an information recording medium, as well as on reflected sub-beams from the information recording medium.

In the optical device according to the present invention, incident beams to the optical device include a reflected main beam that has irradiated an information recording medium to read main information from the information recording medium and been reflected by the information recording medium and two reflected sub-beams that have irradiated the information recording medium to conduct a tracking operation of a recording track on the information recording medium and been reflected by the information recording medium. The light receiving element has reflected-main-beam receiving regions and reflected-sub-beam receiving regions, the reflected-main-beam receiving regions commonly receiving a reflected main beam without regard to the wavelength of the main beam, the reflected-sub-beam receiving regions receiving reflected sub-beams of the different wavelengths diffracted at different angles through the hologram element, respectively. When one of the reflected-sub-beam receiving regions is receiving an incident beam of one of the wavelengths, the operation unit carries out an operation according to an output signal from the one reflected-sub-beam receiving region and an output signal from another of the reflected-sub-beam receiving regions, to detect an unnecessary light component.

In the optical device according to the present invention, the hologram element is divided into two regions along a straight dividing line. When a light beam to read information from an information recording medium irradiates the information recording medium, is reflected by the information recording medium, and is made incident to the hologram element, the dividing line halving the hologram element into the two regions is in parallel with a recording track of the information recording medium when mapped on the information recording medium, and the hologram element diffracts the reflected beam and halves the reflected beam in a direction orthogonal to the recording track in terms of an optically mapped image.

The optical device avoids the influence of unnecessary light only on reflected sub-beams that are greatly affected by the unnecessary light, to thereby avoid an increase in the size of the operation circuit.

In the optical device according to the present invention, the wavelength of an incident beam is close to one of the first wavelength of 780-nm band and second wavelength of 660-nm band.

The optical device is applicable to optical disks of the DVD (digital versatile disk) standard and optical disks of the CD (compact disk) standard.

In the optical device according to the present invention, at least one of a light source for emitting light of the first wavelength and a light source for emitting light of the second wavelength is integrally formed on a substrate on which the light receiving element is arranged.

In the optical device, at least one of the light sources is integrally formed on a substrate on which the light receiving element is arranged, to easily determine the wavelength of a beam.

An optical pickup apparatus according to the present invention includes the above-mentioned optical device and a laser source for emitting light of the first wavelength and a laser source for emitting light of the second wavelength. Light from the light sources irradiates an information recording medium, and reflected beams from the information recording medium are made incident to the optical device to read information from the information recording medium.

In the optical pickup apparatus, when one of the light receiving regions is receiving an incident beam of one of the wavelengths, the operation unit carries out an operation according to an output signal from the one light receiving region and an output signal from another one of the light receiving regions, to detect an unnecessary light component and avoid the influence of the unnecessary light component.

An optical pickup apparatus according to the present invention includes the above-mentioned optical device, a first laser source for emitting a laser beam of the first wavelength, a first diffraction grating for dividing the laser beam of the first wavelength from the first laser source into a main beam and two sub-beams, a second laser source arranged in the optical device, for emitting a laser beam of the second wavelength, and a second diffraction grating arranged in the optical device, for dividing the laser beam of the second wavelength from the second laser source into a main beam and two sub-beams. The laser beams emitted from the laser sources irradiate an information recording medium. Reflected beams from the information recording medium are made incident to the optical device. The reflected main beams from the information recording medium are used to read main information from the information recording medium. The reflected sub-beams from the information recording medium are used to read a tracking error signal from the information recording medium.

In the optical pickup apparatus, when one of the light receiving regions is receiving an incident beam of one of the wavelengths, the operation unit carries out an operation according to an output signal from the one light receiving region and an output signal from another one of the light receiving regions, to detect an unnecessary light component and avoid the influence of the unnecessary light component.

An optical pickup apparatus according to the present invention includes the above-mentioned optical device, a first laser source arranged in the optical device, for emitting a laser beam of the first wavelength, a first diffraction grating arranged in the optical device, for dividing the laser beam of the first wavelength from the first laser source into a main beam and two sub-beams, a second laser source for emitting a laser beam of the second wavelength, and a second diffraction grating for dividing the laser beam of the second wavelength from the second laser source into a main beam and two sub-beams. The laser beams emitted from the laser sources irradiate an information recording medium. Reflected beams from the information recording medium are made incident to the optical device. The reflected main beams from the information recording medium are used to read main information from the information recording medium. The reflected sub-beams from the information recording medium are used to read a tracking error signal from the information recording medium.

In the optical pickup apparatus, when one of the light receiving regions is receiving an incident beam of one of the wavelengths, the operation unit carries out an operation according to an output signal from the one light receiving region and an output signal from another one of the light receiving regions, to detect an unnecessary light component and avoid the influence of the unnecessary light component.

When reproducing or recording/reproducing information signals to and from DVD- and CD-standard optical discs that need light sources of different wavelengths, the optical device and optical pickup apparatus according to the present invention prevent a deterioration of signal modulation level and an offset of an error signal, easily secure a dynamic range for an operation circuit, suppress an increase in the number of signal output channels to thereby prevent an increase in the size of the operation circuit, and prevent an increase in the number of wiring pins to thereby reduce the size of the optical device.

The optical device according to the present invention can handle information recording media using light sources of different wavelengths, such as DVD-standard optical discs (recordable optical discs of DVD-RAM, DVD-R, DVD-RW, +R, and +RW standards employing a laser beam of 650-nm band) and CD-standard optical discs (recordable optical discs of CD-R and CD-RW standards employing a laser beam of 780-nm band).

Laser light condensed on an optical disc through an objective lens includes a component condensed to a spot as well as a flare component caused by diffraction of the objective lens. The optical device according to the present invention can suppress the influence of reflection of the flare component that diffuses over the light receiving element of the optical device, thereby preventing a deterioration of signal modulation level and an offset of an error signal.

When reproducing a DVD-standard optical disc having two recording layers, reflection from a non-objective recording layer may spread over the light receiving element of the optical device. The optical device according to the present invention can suppress the influence of such reflection, thereby preventing a deterioration of signal modulation level and an offset of an error signal.

The optical device prepares three beams, i.e., a main beam and two sub-beams when achieving the three-beam method or the DPP method. To secure recording power, the intensity of the main beam is set to be greater than that of the sub-beams. In this case, the optical device according to the present invention can suppress the influence of diffusion of the main beam over light receiving regions for the sub-beams, thereby preventing a deterioration of signal modulation level and an offset of an error signal and securing a dynamic range for an operation circuit.

The optical device employs the hologram element to diffract incident beams of different wavelengths. There is no need for the optical device of the present invention to increase the area of each light receiving region for sub-beams. This results in reducing the influence of unnecessary reflected beams, preventing a deterioration of signal modulation level and an offset of an error signal, and securing a dynamic range for an operation circuit.

In this way, the present invention provides the optical device and the optical pickup apparatus employing the optical device, capable of reproducing or recording/reproducing information signals to and from DVD- and CD-standard optical discs that need light sources of different wavelengths, avoiding an influence of unnecessary reflected light from an optical disc, and simplifying operation to be carried out on output signals.

BEST MODE FOR CARRYING OUT THE INVENTION

An optical device and an optical pickup apparatus according to embodiments of the present invention will be explained in detail with reference to the drawings.

[Structure of Optical Pickup Apparatus]

Figure 1:
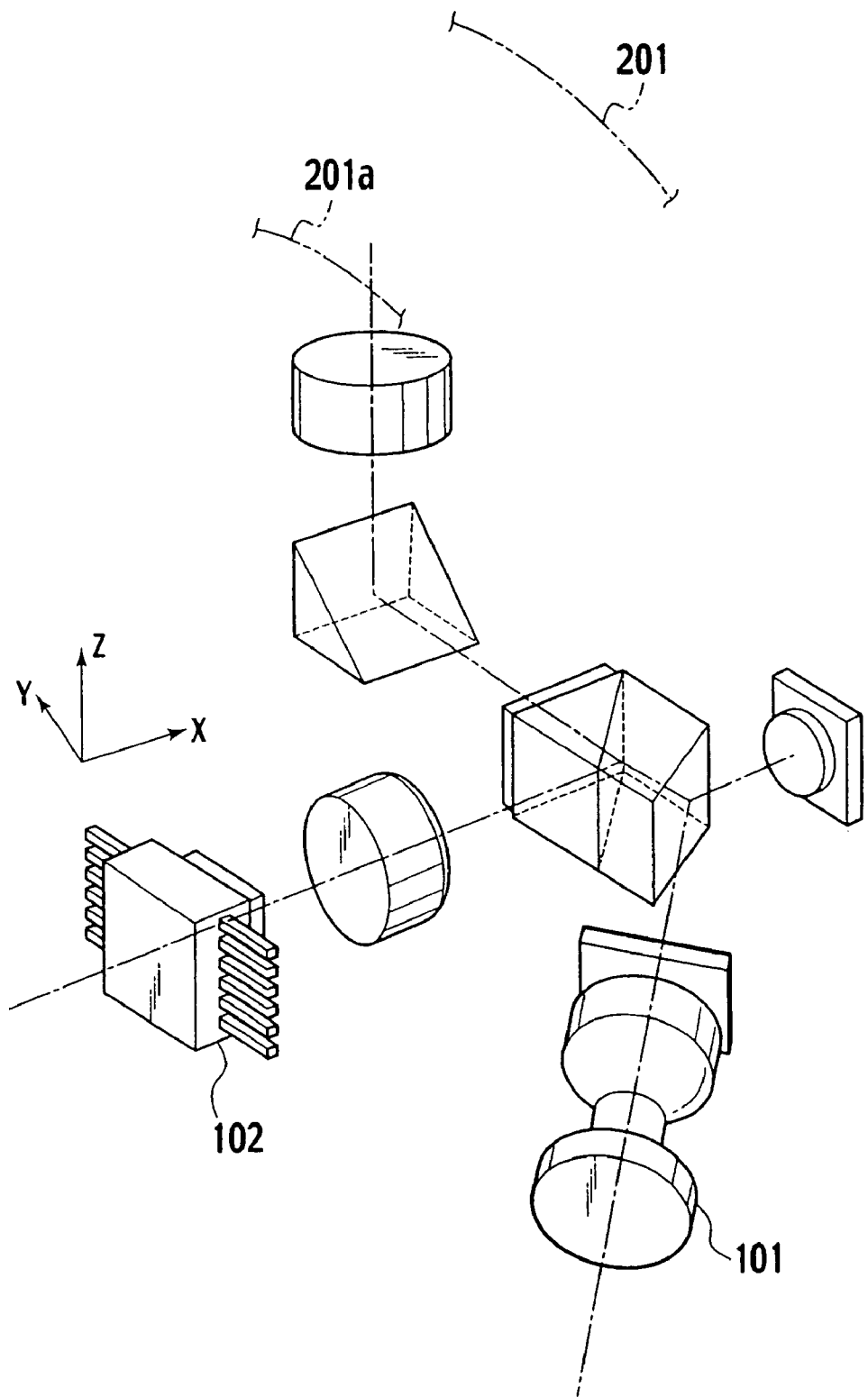
FIG. 1 is a perspective view showing the structure of an optical pickup apparatus according to a related art.
Figure 2:
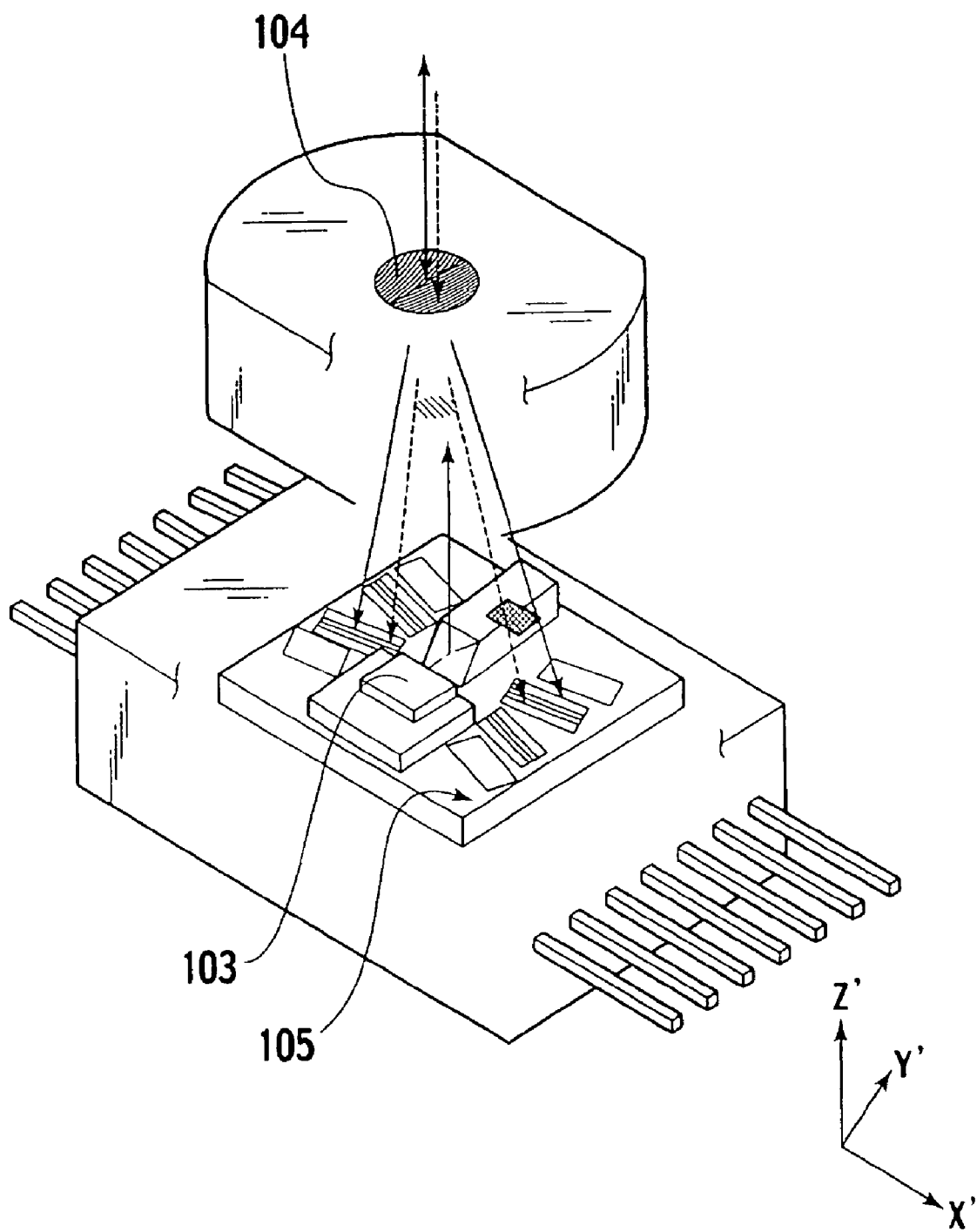
FIG. 2 is a perspective view showing the structure of an optical device according to the related art.
Figure 3:
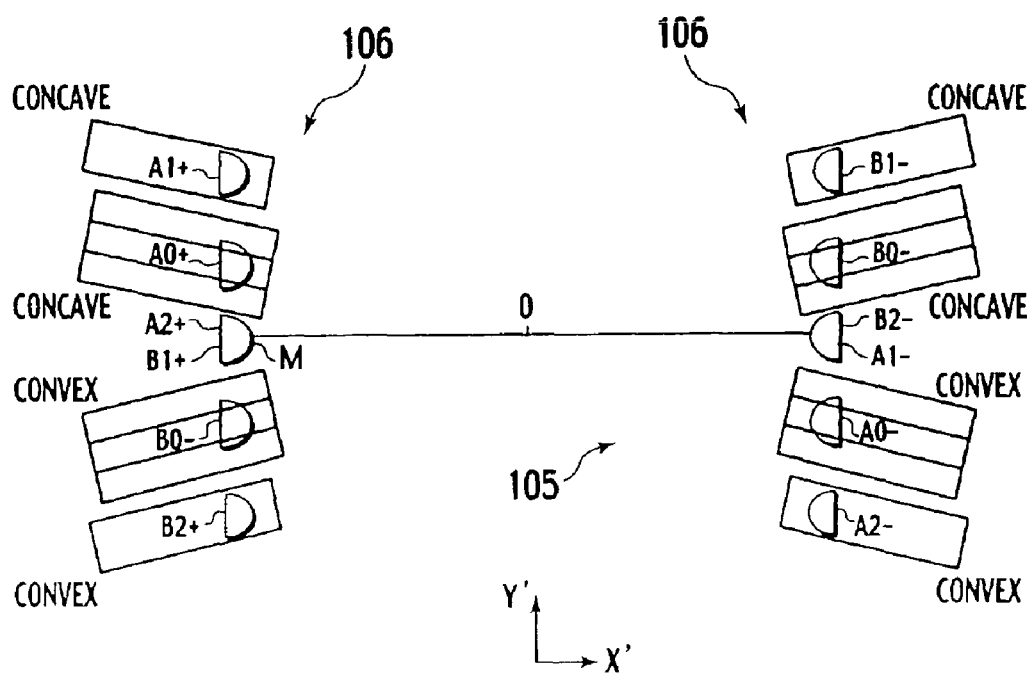
FIG. 3 is a plan view showing a light receiving element of the optical device of the related art.
Figure 4:
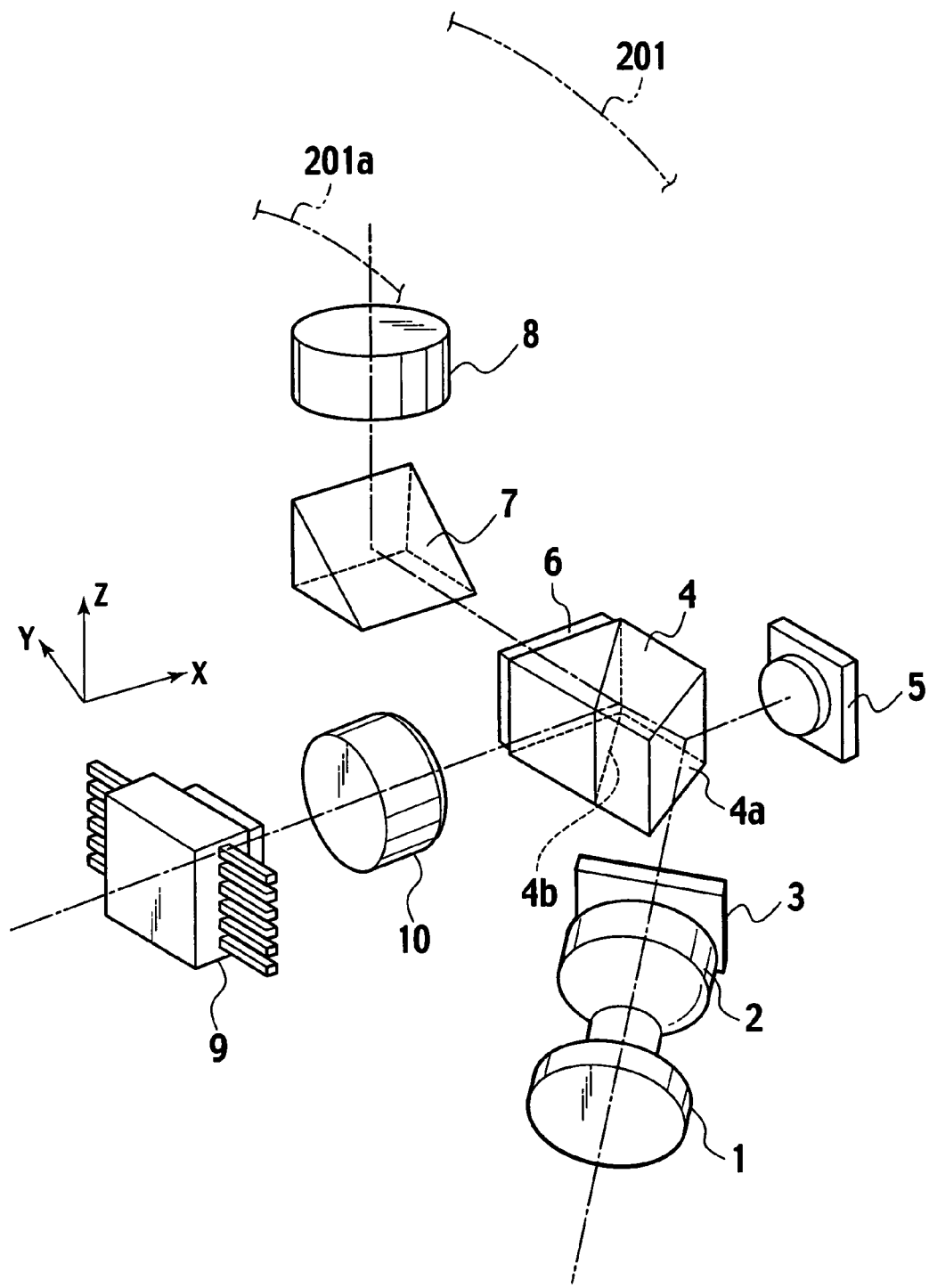
FIG. 4 is a perspective view showing the structure of an optical pickup apparatus according to the present invention.

FIG. 4 is a perspective view showing the structure of an optical pickup apparatus according to the present invention.

The optical pickup apparatus shown in FIG. 4 has a first laser source 1 to emit laser light having a first wavelength (of, for example, a 650-nm band). The laser light of first wavelength emitted from the first laser source 1 is passed through a collimator lens 2, to become parallel light. The parallel light is divided through a first grating 3 into a 0th-order beam, a +1st-order beam, and a −1st-order beam. The three beams are made incident to a beam splitter prism 4 having a beam shaping function. The 0th-order beam from the first grating 3 becomes a main beam to record or reproduce an information signal to or from an optical disc. The ±1st-order beams become first and second sub-beams to detect a tracking error signal.

At the beam splitter prism 4, the laser light of first wavelength is obliquely made incident to an incident face 4a, is shaped thereby, and enters the beam splitter prism 4.

On the incident face 4a of the beam splitter prism 4, the laser light of first wavelength is partly reflected, and the reflected part is received by a first monitor photodiode 5 to detect laser power.

The laser light of first wavelength in the beam splitter prism 4 is transmitted through a reflection film 4b for beam separation, is emitted from the beam splitter prism 4, and is transmitted through a λ/4 (quarter wave) plate 6 to become circularly polarized light.

The laser light of first wavelength is reflected by a mirror 7 so as to bend its optical path and is made incident to an objective lens 8. The objective lens 8 condenses the laser light of first wavelength onto a signal recording face of a first-type optical disc 201 that is an information recording medium conforming to the laser light of first wavelength. The first-type optical disc is, for example, a DVD-standard optical disc.

The optical pickup apparatus has an optical device 9 according to the present invention. The optical device 9 incorporates a second laser source (to be explained later) for emitting laser light having a second wavelength (of, for example, 780-nm band). The laser light of second wavelength emitted from the second laser source emanates from the optical device 9 and is passed through a collimator lens 10, to become parallel light. The parallel light is made incident to the beam splitter prism 4.

In the beam splitter prism 4, the laser light of second wavelength is reflected by the reflection film 4b, is emitted from the beam splitter prism 4, and is transmitted through the λ/4 (quarter wave) plate 6.

The laser light of second wavelength is reflected by the mirror 7 so as to bend its optical path and is made incident to the objective lens 8. The objective lens 8 condenses the laser light of second wavelength onto a signal recording face of a second-type optical disc 201 that is an information recording medium conforming to the laser light of second wavelength. The second-type optical disc is, for example, a CD-standard optical disc.

In the optical pickup apparatus, the laser light of first wavelength condensed on the signal recording face of the first-type optical disc (DVD-standard optical disc) 201 is reflected by the signal recording face. The laser light of second wavelength condensed on the signal recording face of the second-type optical disc (CD-standard optical disc) 201 is reflected by the signal recording face. The reflected laser light of first or second wavelength is passed through the objective lens 8, is reflected by the mirror 7, and is made incident to the beam splitter prism 4. In the beam splitter prism 4, the reflected light of first or second wavelength is reflected by the reflection film 4b and is emitted from the beam splitter prism 4 toward the optical device 9.

The reflected light enters the optical device 9 and is received by a light receiving element incorporated in the optical device 9. According to optical detection outputs from the light receiving element, an information signal and an error signal related to the optical disc are obtained.

[Structure of Optical Device]

Figure 5:
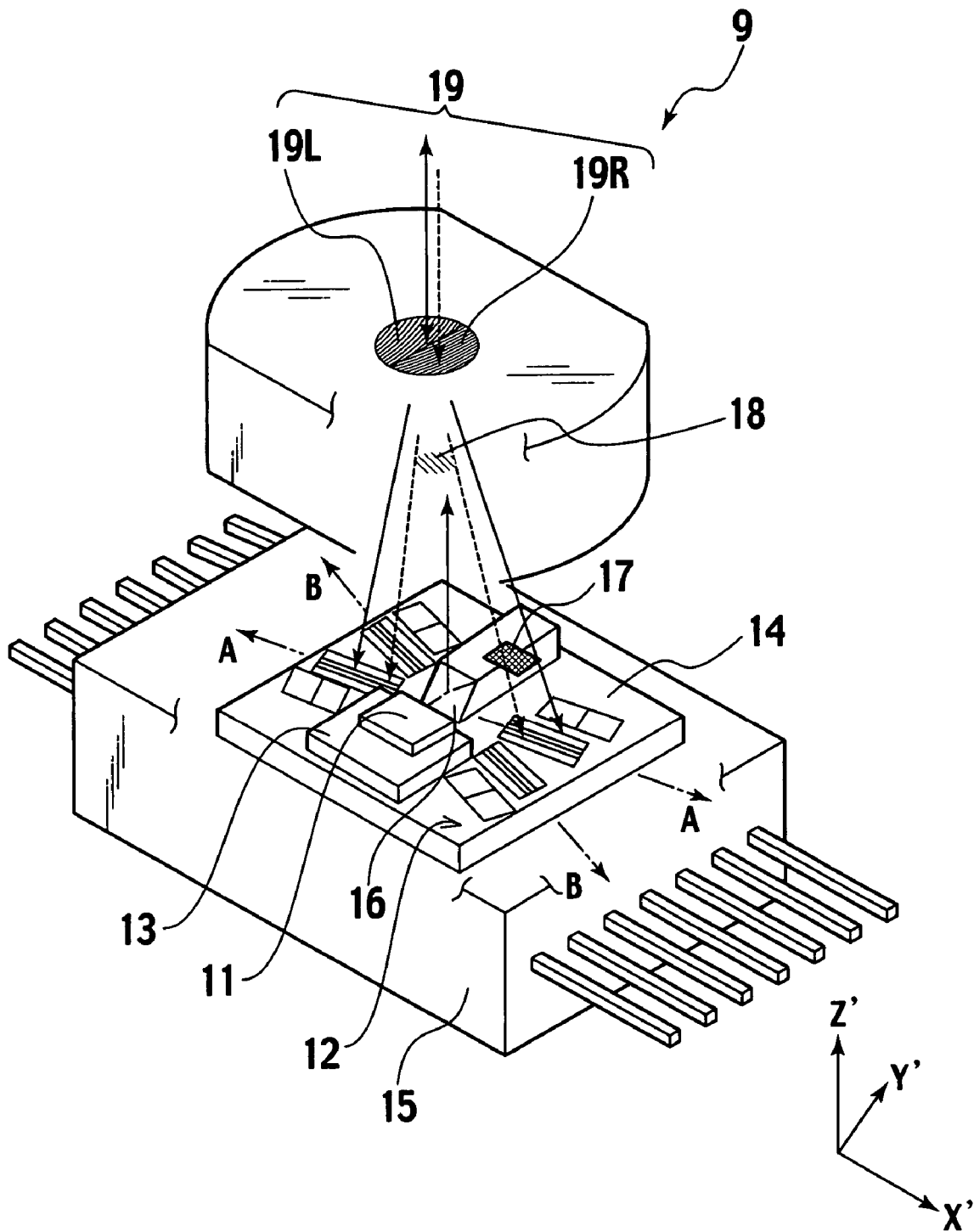
FIG. 5 is a perspective view showing an optical device according to the present invention.

FIG. 5 is a perspective view showing a structure of the optical device according to the present invention.

The optical device of the present invention shown in FIG. 5 has the second laser source 11 to emit laser light of the second wavelength and the light receiving element 12 to receive reflected light from the optical disc 201.

The second laser source 11 is arranged on a sub-mount 13, which is arranged on a light receiving element base 14. The base 14 is supported on a package (casing) 15. The second laser source 11 is arranged so as to emit laser light of the second wavelength in a direction parallel to the surface of the base 14.

The second laser source 11 is positioned on the light receiving element base 14 so that reflected light of the laser light of first wavelength and the laser light of second wavelength may be condensed and returned to the same position in the optical device 9. Namely, the second laser source 11 is set so that an optical axis of reflected light of the laser light of first wavelength may agree with an optical axis of reflected light of the laser light of second wavelength on the light receiving element 12. The second laser source 11 is set so that a conjugate point of an emission point of the laser light of first wavelength may agree with an emission point of the laser light of second wavelength, or the conjugate point of the laser light of first wavelength and the emission point of the laser light of second wavelength may be on the same optical axis. The conjugate point of the laser light of first wavelength is a point where an image of an emission point of the laser light of first wavelength is formed in an optical system including the beam splitter prism 4.

The light receiving element 12 is formed on the light receiving element base 14 supported on the package 15. The light receiving element 12 has a plurality of light receiving faces formed on the surface of the base 14 and receives light made incident to the surface of the base 14.

The optical device 9 has a micromirror 16. The second laser source 11 emits laser light of the second wavelength in parallel with the surface of the light receiving element base 14 (in a Y'-axis direction in FIG. 5). The micromirror 16 reflects the laser light of second wavelength in a direction perpendicular to the surface of the base 14 (in a Z'-axis direction in FIG. 5). The micromirror 16 is a prism having an oblique end face inclined at an angle of 45°. The oblique end face reflects the laser light of second wavelength. The micromirror 16 is set on the base 14 so that the oblique end face of the micromirror 16 is oriented toward the second laser source 11.

At the position on the light receiving element base 14 where the micromirror 16 is arranged, there is a second monitor photodiode 17 to detect power of the laser light of second wavelength. The laser light of second wavelength is partly reflected by the oblique end face of the micromirror 16, and the remnant of the laser light of second wavelength is transmitted through the oblique end face of the micromirror 16 and is received by the second monitor photodiode 17.

The laser light of second wavelength reflected by the micromirror 16 is divided through a second grating 18 into a 0th-order beam, a +1st-order beam, and a −1st-order beam. The 0th-order beam from the second grating 18 becomes a main beam to record or reproduce an information signal to or from an optical disc. The ±1st-order beams become first and second sub-beams to detect a tracking error signal.

The laser light of second wavelength from the second grating 18 is transmitted through a hologram element 19 and is emitted from the optical device 9. The optical device 9 performs a diffraction action on the light (outgoing light) emitted from the optical device 9. However, the diffracted component of the outgoing light is not used.

The optical device 9 receives reflected light (return light) of the first wavelength from the first-type optical disc (DVD-standard optical disc), as well as reflected light (return light) of the second wavelength from the second-type optical disc (CD-standard optical disc). The reflected light is transmitted through the hologram element 19 and advances toward the light receiving element base 14. The hologram element 19 is an optical element made of a transparent substrate on which a periodic fine irregularity structure is formed from an optically transparent material.

The hologram element 19 is divided into first and second regions 19L and 19R having different characteristics. The hologram element 19 as a whole has a circular shape, and the first and second regions 19L and 19R are formed by halving the hologram element 19 into semicircles.

A dividing line that divides the hologram element 19 into the first and second regions 19L and 19R passes through the center (optical axis) of the hologram element 19 and is parallel to a tangent of the recording track 201a of the optical disc 201 when optically mapped onto the optical disc 201. Namely, reflected light from the optical disc 201 is halved by the dividing line of the hologram element 19 with respect to a radial direction of the optical disc 201, so that one half is transmitted through the first region 19L and the other half through the second region 19R.

Each of the first and second regions 19L and 19R of the hologram element 19 diffracts the reflected light of first or second wavelength and provides ±1st-order diffracted beams that are used to obtain a tracking error signal and a focus error signal.

The first region 19L diffracts the reflected light of first or second wavelength in directions indicated with arrows A in FIG. 5, to provide ±1st-order diffracted beams. The second region 19R diffracts the reflected light of first or second wavelength in directions indicated with arrows B in FIG. 5, to provide ±1st-order diffracted beams. The diffraction directions of the first region 19L are different from those of the second region 19R.

Figure 6:
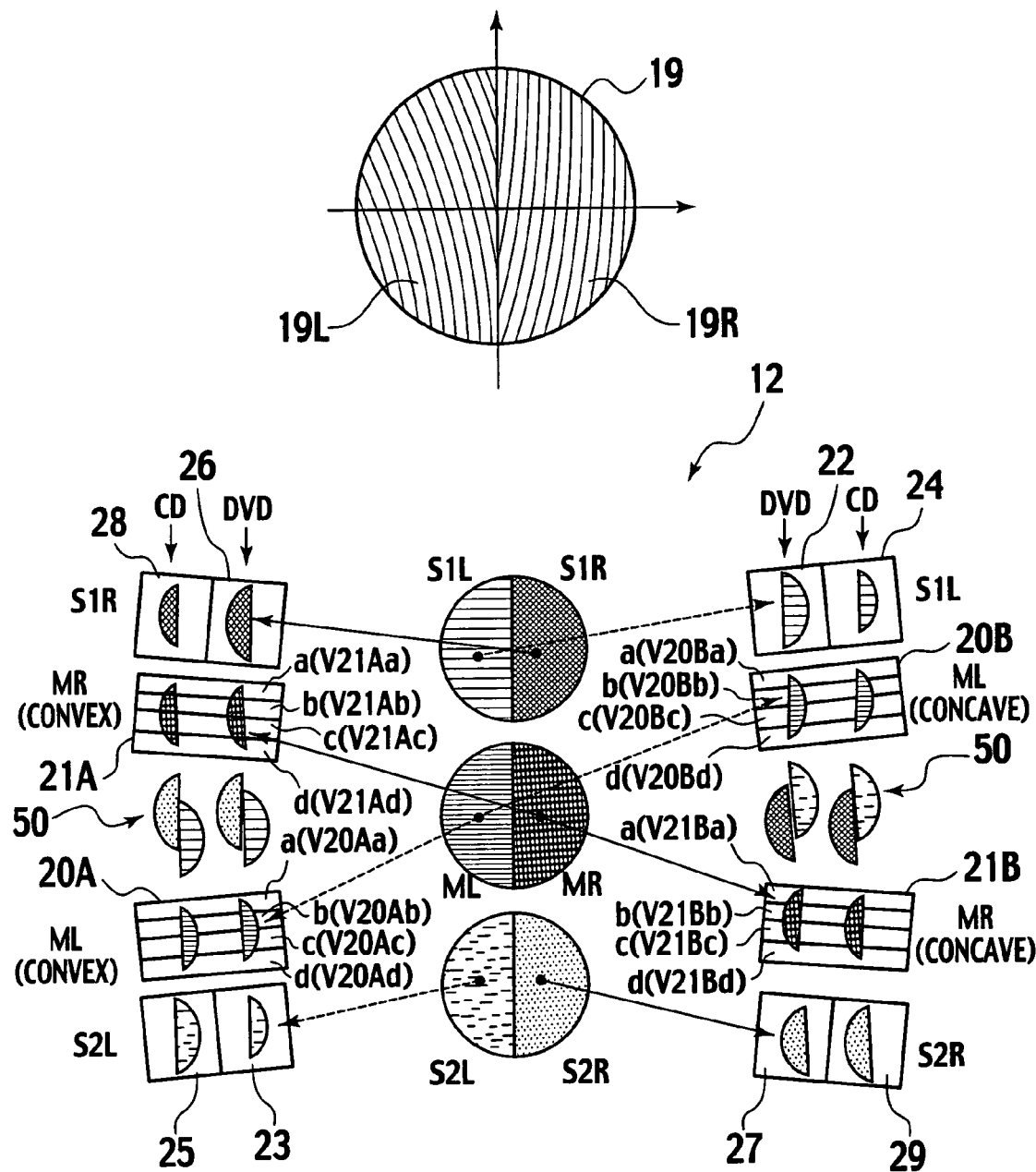
FIG. 6 is a plan view showing a positional relationship between a hologram element and light receiving regions of a light receiving element in the optical device of the present invention.

FIG. 6 is a plan view showing positional relationships between the hologram element 19 and the light receiving faces of the light receiving element 12.

In FIG. 6, the hologram element 19 is halved into the first and second regions 19L and 19R in the radial direction of the optical disc 201 when optically mapped onto the optical disc 201. Diffraction axes of the regions 19L and 19R are inclined relative to each other.

A part ML of the reflected main beam from the optical disc 201 is transmitted through the first region 19L of the hologram element 19, and a part MR thereof is transmitted through the second region 19R of the hologram element 19. The parts ML and MR are diffracted in the different directions and are received by different ones of the light receiving faces of the light receiving element 12.

More precisely, a pair of first light receiving faces 20A and 20B of the light receiving element 12 receive parts ML(convex) and ML(concave) of the reflected main beam of first and second wavelengths passed through the first region 19L of the hologram element 19. At the same time, a pair of second light receiving faces 21A and 21B of the light receiving element 12 receive parts MR(convex) and MR(concave) of the reflected main beam of first and second wavelengths passed through the second region 19R of the hologram element 19.

Each of the first and second light receiving faces 20A, 20B, 21A, and 21B is quartered in parallel in a direction substantially orthogonal to the direction in which the hologram element 19 is divided into the regions 19L and 19R. Namely, the quartering direction is the tangential direction of a recording track on the optical disc 201. Each quartered section of the first and second light receiving faces 20A, 20B, 21A, and 21B separately provides an optical detection signal.

According to the optical detection signals from the quartered sections of the first and second light receiving faces 20A, 20B, 21A, and 21B, an information signal, a focus error signal, a wobble signal, and the like concerning the optical disc are obtained.

Namely, the outputs of the first and second light receiving faces 20A, 20B, 21A, and 21B are totaled to obtain an information signal read from the optical disc.

A difference between the sum of the outputs of the first light receiving faces 20A and 20B and the sum of the outputs of the second light receiving faces 21A and 21B is passed through a band-pass filter, to obtain a wobble signal.

The outputs of two central sections (20Ab, 20Ac, 21Ab, 21Ac) of each of the first and second light receiving faces 20A and 21A and the outputs of two side sections (20Ba, 20Bd, 21Ba, 21Bd) of each of the light receiving faces 20B and 21B are summed up. Similarly, two central sections (20Bb, 20Bc, 21Bb, 21Bc) of each of the light receiving faces 20B and 21B and the outputs of two side sections (20Aa, 20Ad, 21Aa, 21Ad) of each of the light receiving faces 20A and 21A are summed up. Thereafter, a difference between the two sums is found to obtain a focus error signal according to a so-called SSD (spot size) method.

The first region 19L of the hologram element 19 has convex lens power for the +1st-order diffracted beam and concave lens power for the −1st-order diffracted beam. The second region 19R of the hologram element 19 has concave lens power for the +1st-order diffracted beam and convex lens power for the −1st-order diffracted beam. Accordingly, the focus error signal is producible according to the output signals of the divided sections of the first and second light receiving faces 20A, 20B, 21A, and 21B. The focus error signal FE is obtained with output signals V20Aa, V20Ab, V20Ac, V20Ad, V20Ba, V20Bb, V20Bc, and V20Bd from the divided sections of the first light receiving faces 20A and 20B and with output signals V21Aa, V21Ab, V21Ac, V21Ad, V21Ba, V21Bb, V21Bc, and V21Bd from the divided sections of the second light receiving faces 21A and 21B as follows:

$$FE = \{(V20Ab + V20Ac + V20Ba + V20Bd) +$$
$$(V21Ab + V21Ac + V21Ba + V21Bd)\} -$$
$$\{(V20Aa + V20Ad + V20Bb + V20Bc) +$$
$$(V21Aa + V21Ad + V21Bb + V21Bc)\}$$

Each of the first and second light receiving faces 20A, 20B, 21A, and 21B to receive reflected main beams from the optical disc 201 may be divided in parallel into three sections with the above-mentioned two central sections being consolidated as one light receiving region.

In this case, the focus error signal FE is obtained with output signals V20Aa, V20Ae (=V20Ab+V20Ac), V20Ad, V20Ba, V20Be (=V20Bb+V20Bc), and V20Bd from the divided sections of the first light receiving faces 20A and 20B and with output signals V21Aa, V21Ae (V21Ab+V21Ac), V21Ad, V21Ba, V21Be (=V21Bb+V21Bc), and V21Bd from the divided sections of the second light receiving faces 21A and 21B as follows:

$$FE = \left\{ \begin{array}{c} (V20Ae + V20Ba + V20Bd) + \\ (V21Aa + V21Ad + V21Ba) \end{array} \right\} - \left\{ \begin{array}{c} (V20Aa + V20Ad + V20Be) + \\ (V21Ae + V21Ba + V21Bd) \end{array} \right\}$$

The reflected first and second sub-beams from the optical disc 201 are divided into parts S1L and S2L through the first region 19L of the hologram element 19 and parts S1R and S2R through the second region 19R of the hologram element 19. The beam parts S1L, S2L, S1R, and S2R are diffracted in different directions and are received by different light receiving faces of the light receiving element 12.

First and second sub-beams are passed through the first diffraction grating 3 or the second diffraction grating 18 and irradiate a recording track of the optical disc. On the optical disc, the first and second sub-beams are oppositely spaced from a main beam by an identical angle in a tangential direction of the optical disc in terms of an optically mapped image. On the signal recording face of the optical disc, the first and second sub-beams each are deviated from the recording track in a radial direction by ½ track pitch in case of the laser light of first wavelength (DVD-standard optical disc) and by ¼ track pitch in case of the laser light of second wavelength (CD-standard optical disc). The sub-beams are reflected by the signal recording face of the optical disc and the reflected beams are made incident to the optical device 9.

When transmitted through the hologram element 19 of the optical device 9, the sub-beams spatially overlap the main beam, and therefore, are diffracted together with the main beam by the hologram element 19. When reaching the surface of the light receiving element base 14, the sub-beams each have a diameter of about several tens of micrometers and are spaced from one another. In this state, the sub-beams are received by the corresponding light receiving faces.

In the light receiving element 12, a third light receiving face 22 receives the reflected beam part S1L of the first sub-beam of first wavelength passed through the first region 19L of the hologram element 19.

In the light receiving element 12, a fourth light receiving face 23 receives the reflected beam part S2L of the second sub-beam of first wavelength passed through the first region 19L of the hologram element 19.

In the light receiving element 12, a fifth light receiving face 24 receives the reflected beam part S1L of the first sub-beam of second wavelength passed through the first region 19L of the hologram element 19.

In the light receiving element 12, a sixth light receiving face 25 receives the reflected beam part S2L of the second sub-beam of second wavelength passed through the first region 19L of the hologram element 19.

In the light receiving element 12, a seventh light receiving face 26 receives the reflected beam part S1R of the first sub-beam of first wavelength passed through the second region 19R of the hologram element 19.

In the light receiving element 12, an eighth light receiving face 27 receives the reflected beam part S2R of the second sub-beam of first wavelength passed through the second region 19R of the hologram element 19.

In the light receiving element 12, a ninth light receiving face 28 receives the reflected beam part S1R of the first sub-beam of second wavelength passed through the second region 19R of the hologram element 19.

In the light receiving element 12, a tenth light receiving face 29 receives the reflected beam part S2R of the second sub-beam of second wavelength passed through the second region 19R of the hologram element 19.

The third light receiving face 22, fourth light receiving face 23, seventh light receiving face 26, and eighth light receiving face 27 serve as a first light receiving region in the optical device 9 according to the present invention. The fifth light receiving face 24, sixth light receiving face 25, ninth light receiving face 28, and tenth light receiving face 29 serve as a second light receiving region in the optical device 9 according to the present invention.

In connection with an advancing direction of each sub-beam relative to a recording track on an optical disk, a leading sub-beam is the first sub-beam S1 and a trailing sub-beam is the second sub-beam S2. These reflected sub-beams are diffracted by the first and second regions 19L and 19R of the hologram element 19, to form the reflected sub-beams S1L, S1R, S2L, and S2R. As shown in FIG. 6, these reflected sub-beams maintain positional relationships with respect to the reflected main beams and are received by the corresponding light receiving faces.

To detect a focus error signal, each of the reflected main beam receiving faces 20A, 20B, 21A, and 21B is divided in parallel into four sections. On the other hand, each of the reflected sub-beam receiving faces is not divided into sections because it is only required to totally detect the integrated quantity of light for each of the reflected sub-beams.

Due to a diffraction principle, the hologram element 19 provides different diffraction angles for different wavelengths of transmitted light. Accordingly, the hologram element 19 diffracts a sub-beam of the second wavelength (780-nm band) larger than a sub-beam of the first wavelength (650-nm band) that is shorter than the second wavelength. As shown in FIG. 6, the sub-beam of first wavelength is received on an inner side (closer to an optical axis) of a light receiving face, and the sub-beam of second wavelength is received on an outer side (farther from the optical axis) of the light receiving face. Depending on arriving positions of the sub-beams, the light receiving faces for the sub-beams are slightly inclined and are each formed in a rectangular shape.

The optical device 9 uses one of the two ±1st-order diffracted sub-beams provided by the hologram element 19. Between the light receiving faces 20A and 21A and between the light receiving faces 20B and 21B, there are sub-beam spots 50 that are not used in this embodiment.

Figure 7:
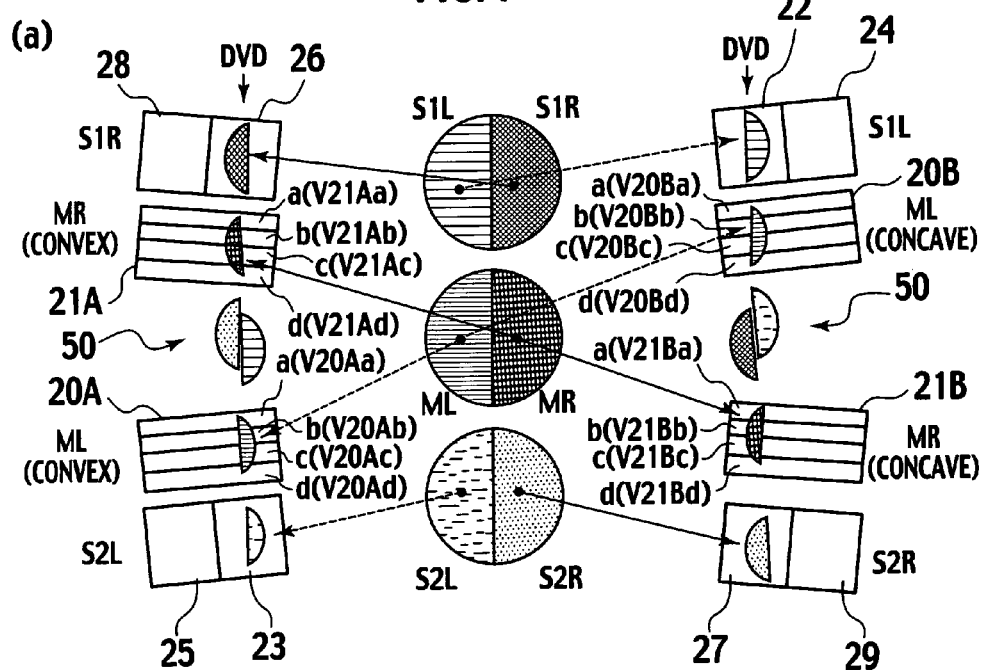
FIG. 7(a) is a plan view showing states of reflected light on the light receiving element of the optical device of the present invention when a first-type optical disc is used.
FIG. 7(b) is a plan view showing states of reflected light on the light receiving element of the optical device of the present invention when a second-type optical disc is used.
Figure 7:
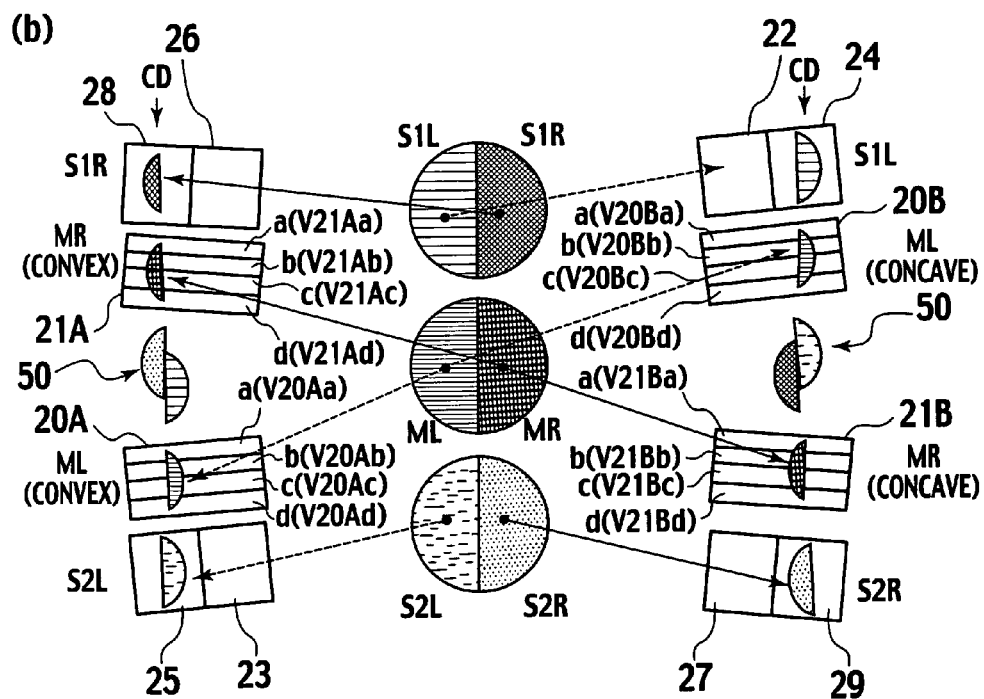

FIG. 7(a) is a plan view showing states of reflected beams on the light receiving element of the optical device when the first-type optical disk (DVD-standard optical disk) is used and FIG. 7(b) is a plan view showing states of reflected beams on the light receiving element of the optical device when the second-type optical disk (CD-standard optical disk) is used.

For the first-type optical disk (DVD-standard optical disk), the optical pickup apparatus employs the laser source of first wavelength to record or reproduce information. In this case, the optical device 9 receives, as shown in FIG. 7(a), a reflected main beam with the first to fourth light receiving faces 20A, 20B, 21A, and 21B, a reflected first sub-beam with the third and seventh light receiving faces 22 and 26, and a reflected second sub-beam with the fourth and eighth light receiving faces 23 and 27.

For the second-type optical disk (CD-standard optical disk), the optical pickup apparatus employs the laser source of second wavelength to record or reproduce information. In this case, the optical device 9 receives, as shown in FIG. 7(b), a reflected main beam with the first to fourth light receiving faces 20A, 20B, 21A, and 21B, a reflected first sub-beam with the fifth and ninth light receiving faces 24 and 28, and a reflected second sub-beam with the sixth and tenth light receiving faces 25 and 29.

In the optical device 9, the objective lens 8 of the optical pickup apparatus produces a flare. If the optical disc has two recording layers, the recording layer that is not a reproducing object reflects unnecessary light. Such flare and unnecessary light spread over the light receiving element base 14, to produce a direct current (DC) component in an optical detection output. The DC component is substantially proportional to the area of a given light receiving face and is irrelevant to the intensity of a light spot received at the given light receiving face.

In the optical device 9, reflected sub-beams of the first wavelength and reflected sub-beams of the second wavelength are received by different light receiving faces even if the reflected sub-beams are transmitted through the same region of the hologram element 19. Accordingly, the optical device 9 can minimize the area of each light receiving face for receiving a reflected sub-beam, thereby suppressing the influence of the unnecessary light.

Figure 8:
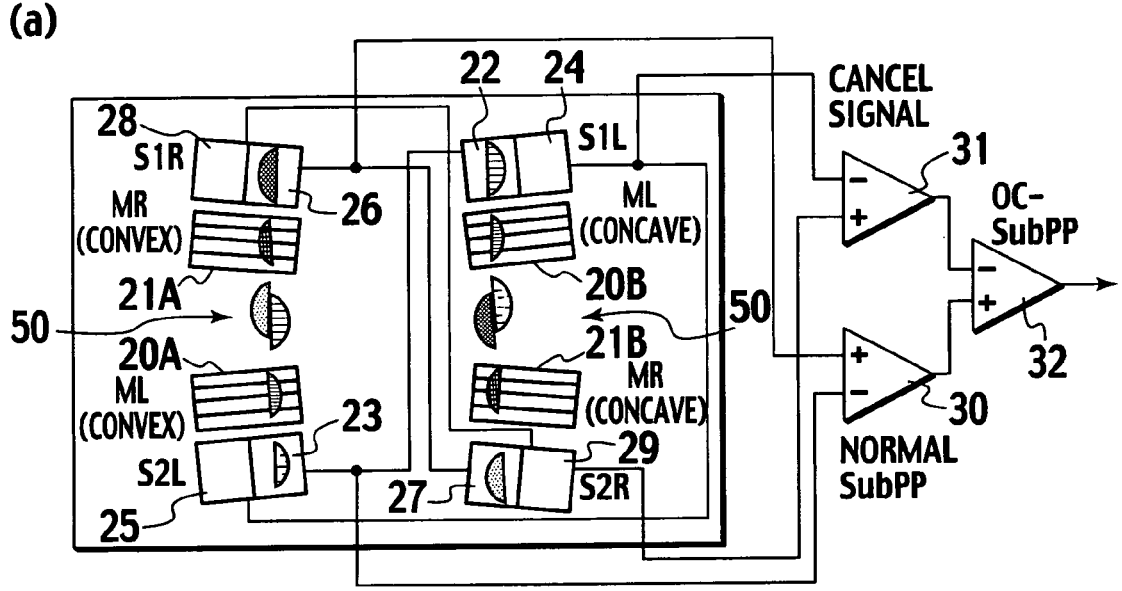
FIG. 8(a) is a plan view showing an operation circuit of the optical device of the present invention when processing a tracking error signal related to the first-type optical disc.
FIG. 8(b) is a plan view showing the operation circuit of the optical device of the present invention when processing a tracking error signal related to the second-type optical disc.
Figure 8:
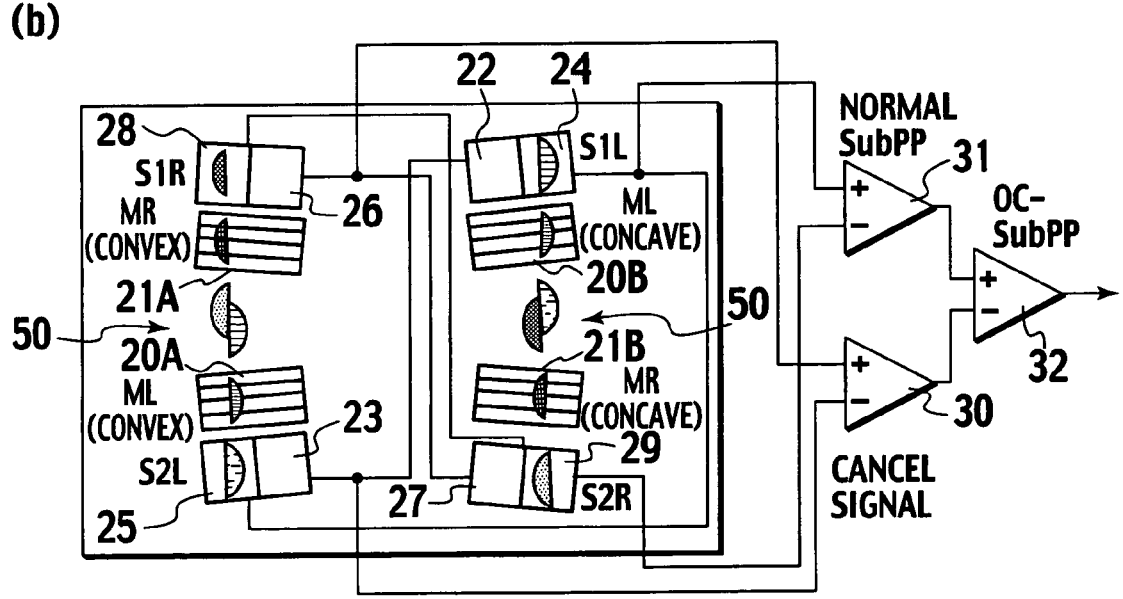

FIG. 8(a) is a plan view showing an operation circuit to provide a tracking error signal TE for the first-type optical disc (DVD-standard optical disc) and FIG. 8(b) is a plan view showing the operation circuit to provide a tracking error signal TE for the second-type optical disc (CD-standard optical disc).

In the optical device, a tracking error signal is generated according to a method that is dependent on the type of an optical disc.

For the first-type optical disc (DVD-standard optical disc), a so-called push-pull (PP) method is employed as shown in FIG. 8(a) to provide a push-pull signal (SubPP) and a cancel signal (CS) for avoiding the influence of unnecessary light.

In the optical device 9, a push-pull signal (SubPP) is obtained for each of the first and second sub-beams and is processed with a cancel signal, to generate a tracking error signal TE (OC-SubPP).

The push-pull signal (SubPP) of each sub-beam corresponds to a difference between the intensity of the sub-beam transmitted through the first region 19L of the hologram element 19 and the intensity of the sub-beam transmitted through the second region 19R of the hologram element 19 and is obtained as follows with a detection output S1L from the third light receiving face 22, a detection output S2L from the fourth light receiving face 23, a detection output S1R from the seventh light receiving face 26, and a detection output S2R from the eighth light receiving face 27:

$$SubPP=(S1R+S2R)-(S1L+S2L)$$

In the optical device 9, detection outputs from the third and fourth light receiving faces 22 and 23 are combined into a common output, and detection outputs from the seventh and eighth light receiving faces 26 and 27 are combined into a common output. Accordingly, there is no need of calculating (S1R+S2R) and (S1L+S2L). Due to this, the push-pull signal (SubPP) of sub-beams is obtained with a single first subtracter 30 serving as an operation unit, as shown in FIG. 8(a).

In the optical device 9, a cancel signal (CS) for the first-type optical disc (DVD-standard optical disc) is obtained as follows with a detection output S1L' from the fifth light receiving face 24, a detection output S2L' from the sixth light receiving face 25, a detection output S1R' from the ninth light receiving face 28, and a detection output S2R' from the tenth light receiving face 29:

$$CS=(S1R'+S2R')-(S1L'+S2L')$$

In the optical device 9, detection outputs from the fifth and sixth light receiving faces 24 and 25 are combined into a common output, and detection outputs from the ninth and tenth light receiving faces 28 and 29 are combined into a common output. Accordingly, there is no need of calculating (S1R'+S2R') and (S1L'+S2L'). Due to this, the cancel signal (CS) is obtained with a single second subtracter 31 serving as an operation unit, as shown in FIG. 8(a).

A difference signal between the push-pull signal (SubPP) from the first subtracter 30 and the cancel signal (CS) from the second subtracter 31 is obtained by a third subtracter 32 serving as an operation unit, to provide a tracking error signal TE (OC-SubPP).

The operation units, i.e., the subtracters 30, 31, and 32 may be arranged on the light receiving element base 14.

For the second-type optical disc (CD-standard optical disc), the push-pull (PP) method is employed as shown in FIG. 8(b) to provide a push-pull signal (SubPP) and a cancel signal (CS) for avoiding the influence of unnecessary light.

In the optical device 9, a push-pull signal (SubPP) is obtained for each of the first and second sub-beams and is processed with a cancel signal, to generate a tracking error signal TE (OC-SubPP).

The push-pull signal (SubPP) of each sub-beam corresponds to a difference between the intensity of a sub-beam transmitted through the first region 19L of the hologram element 19 and the intensity of a sub-beam transmitted through the second region 19R of the hologram element 19 and is obtained as follows with a detection output S1L from the fifth light receiving face 24, a detection output S2L from the sixth light receiving face 25, a detection output S1R from the ninth light receiving face 28, and a detection output S2R from the tenth light receiving face 29:

$$SubPP=(S1R+S2R)-(S1L+S2L)$$

In the optical device 9, detection outputs from the fifth and sixth light receiving faces 24 and 25 are combined into a common output, and detection outputs from the ninth and tenth light receiving faces 28 and 29 are combined into a common output. Accordingly, there is no need of calculating (S1R+S2R) and (S1L+S2L). Due to this, the push-pull signal (SubPP) of sub-beams is obtained with the single second subtracter 31 serving as an operation unit, as shown in FIG. 8(b).

In the optical device 9, a cancel signal (CS) for the second-type optical disc (CD-standard optical disc) is obtained as follows with a detection output S1L' from the third light receiving face 22, a detection output S2L' from the fourth light receiving face 23, a detection output S1R' from the seventh light receiving face 26, and a detection output S2R' from the eighth light receiving face 27:

$$CS=(S1R'+S2R')-(S1L'+S2L')$$

In the optical device 9, detection outputs from the third and fourth light receiving faces 22 and 23 are combined into a common output, and detection outputs from the seventh and eighth light receiving faces 26 and 27 are combined into a common output. Accordingly, there is no need of calculating (S1R'+S2R') and (S1L'+S2L'). Due to this, the cancel signal (CS) is obtained with the single first subtracter 30 serving as an operation unit, as shown in FIG. 8(b).

A difference signal between the push-pull signal (SubPP) from the second subtracter 31 and the cancel signal (CS) from the first subtracter 30 is obtained by the third subtracter 32 serving as an operation unit, to find a tracking error signal TE (OC-SubPP).

In the optical device 9, the first-type optical disc (DVD-standard optical disc) and second-type optical disc (CD-standard optical disc) are handled by inverting the polarity of the third subtracter 32.

According to the above-mentioned embodiment, the second laser source is incorporated in the optical device 9 and the first laser source is arranged outside the optical device 9. The optical pickup apparatus may incorporate the first laser source in the optical device 9 and arrange the second laser source outside the optical device 9.

A principle of avoiding an influence of unnecessary light on a tracking error signal in the optical device 9 will be explained.

Figure 9:
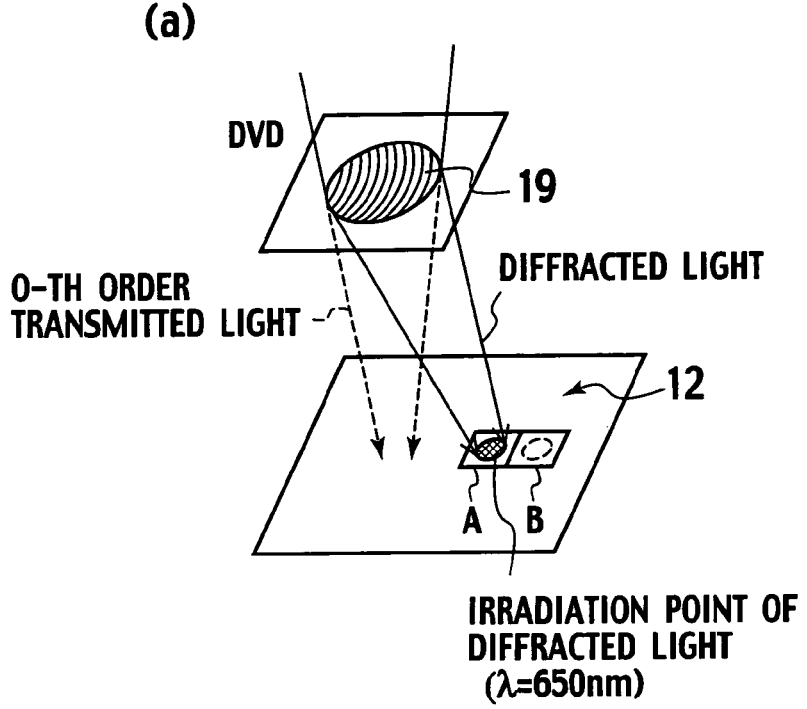
FIG. 9(a) is a plan view showing a state of receiving a reflected sub-beam of first wavelength in the optical device.
FIG. 9(b) is a perspective view showing a state of receiving a reflected sub-beam of second wavelength in the optical device.
Figure 9:
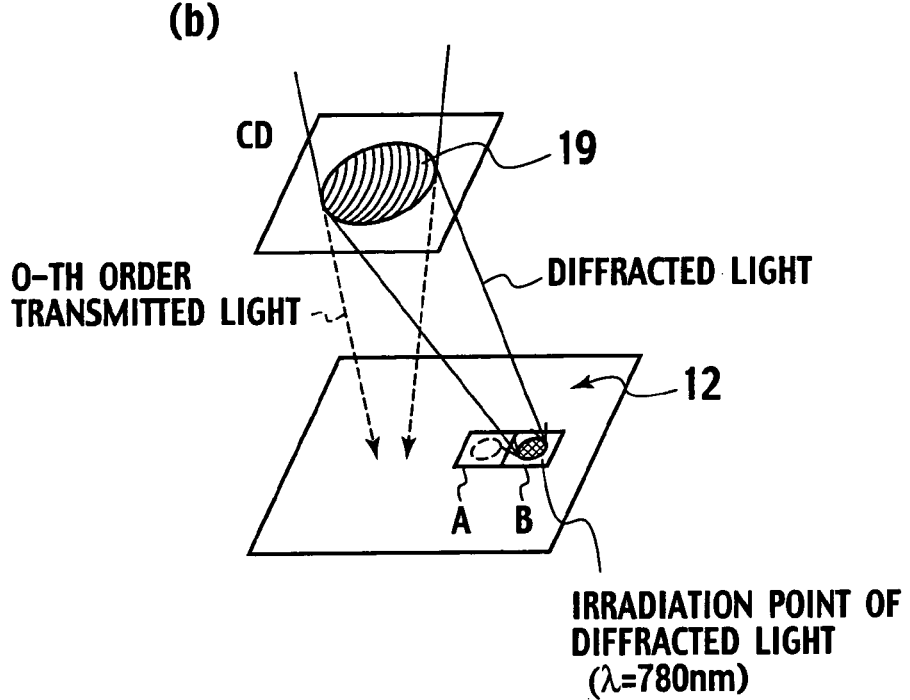

FIG. 9(a) is a perspective view showing a state of the optical device 9 receiving a reflected sub-beam of the first wavelength and FIG. 9(b) is a perspective view showing a state of the optical device 9 receiving a reflected sub-beam of the second wavelength.

As explained above, a diffracted beam from the hologram element 19 in the optical device 9 is received by a light receiving face on the light receiving element 12 and is photoelectrically converted into a current. The same region of a diffractive optical element such as the hologram element 19 provides a different diffraction angle for an incident beam of a different wavelength because of a physical rule. As shown in FIG. 9(a), a reflected sub-beam of the first wavelength (650-nm band) used for the first-type optical disk (DVD-standard optical disk) forms a smaller diffraction angle than a reflected sub-beam of the second wavelength (780-nm band) used for the second-type optical disk (CD-standard optical disk) and irradiates a spot closer to a spot of a 0th-order transmitted beam. As shown in FIG. 9(b), the reflected sub-beam of second wavelength forms a larger diffraction angle than the reflected sub-beam of first wavelength and irradiates a spot away from the spot of the 0th-order transmitted beam.

In consideration of the wavelength dependence of a diffraction angle, the optical device 9 receives a reflected sub-beam of the first wavelength and a reflected sub-beam of the second wavelength at different light receiving regions A and B, respectively.

Problems to be caused by unnecessary light will be explained.

Figure 10:
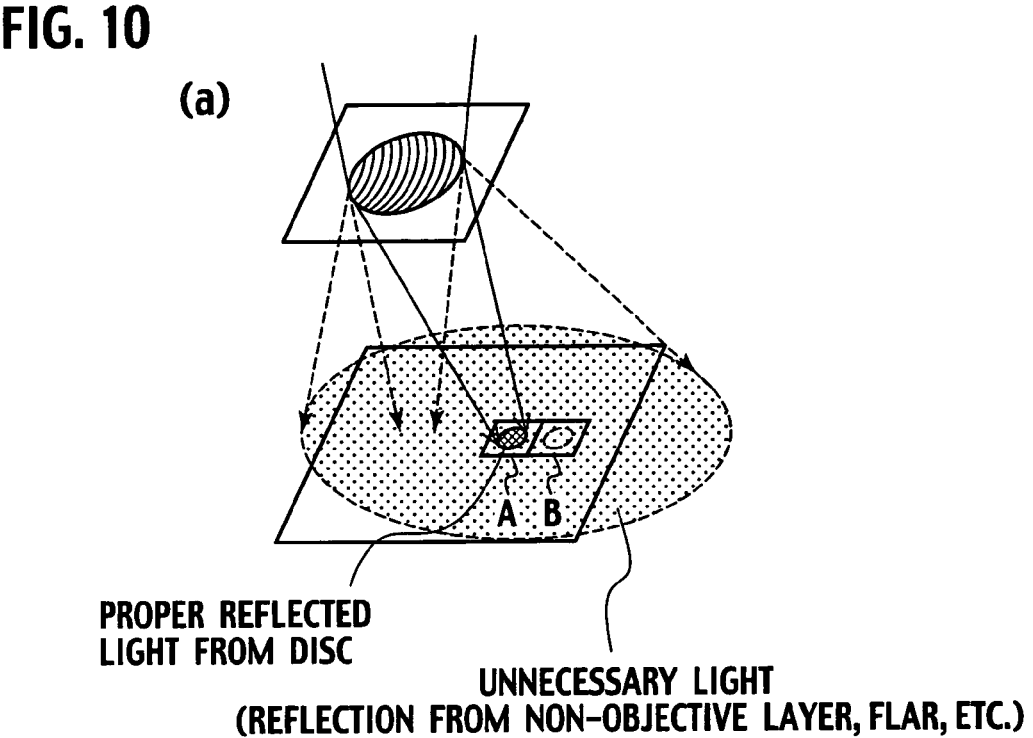
FIGS. 10(a) and 10(b) are perspective and plan views showing a state of an unnecessary beam irradiating the light receiving element in the optical device.
FIG. 10(c) is a view showing a waveform representative of a detected signal.
Figure 10:
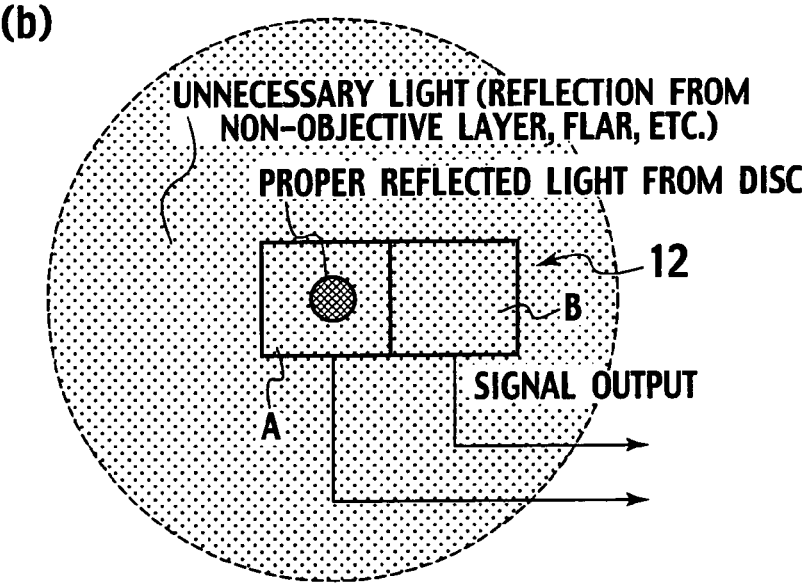
Figure 10:
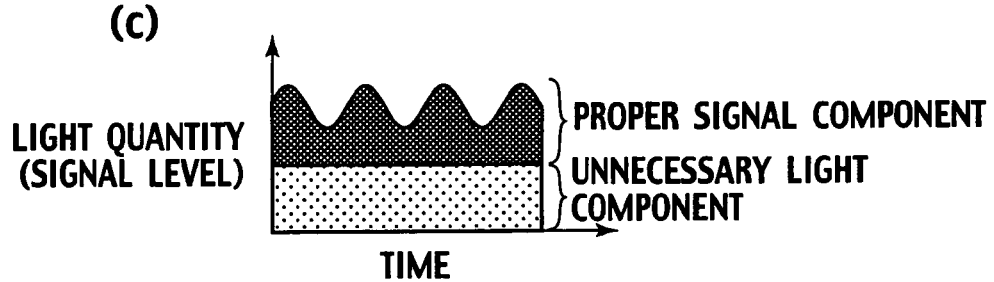

FIG. 10(a) is a perspective view showing unnecessary light irradiating the light receiving element 12, FIG. 10(b) is a plan view showing the same, and FIG. 10(c) is a waveform showing a detection signal.

As explained above, a two-layer disk or an object lens used for each of the first- and second-type optical disks produces in principle unnecessary light together with proper reflected beams used for reproducing recorded information. The unnecessary light does not focus on a point on a disk, and therefore, reflected unnecessary light widely scatters over the light receiving element 12 as shown in FIGS. 10(a) and 10(b).

In addition to a detection signal representative of a proper reflected beam, the unnecessary light component is photoelectrically converted into a signal, which is added to the detection signal. The unnecessary light is not modulated with information of disk pits due to the above-mentioned reason, and therefore, is detected as a substantially constant DC component.

The unnecessary light component is affected by an inclination of the disk, a change in the intensity of recording/reproducing light, an intensity distribution of branched beams, a change due to lens shift, and the like. However, the proportion of the unnecessary light component relative to the proper reflected beam is substantially constant. Accordingly, to avoid the influence of the unnecessary light, subtracting an electric constant value is insufficient. It is necessary to take a measure in consideration of changes in the intensity and distribution of light.

Figure 11:
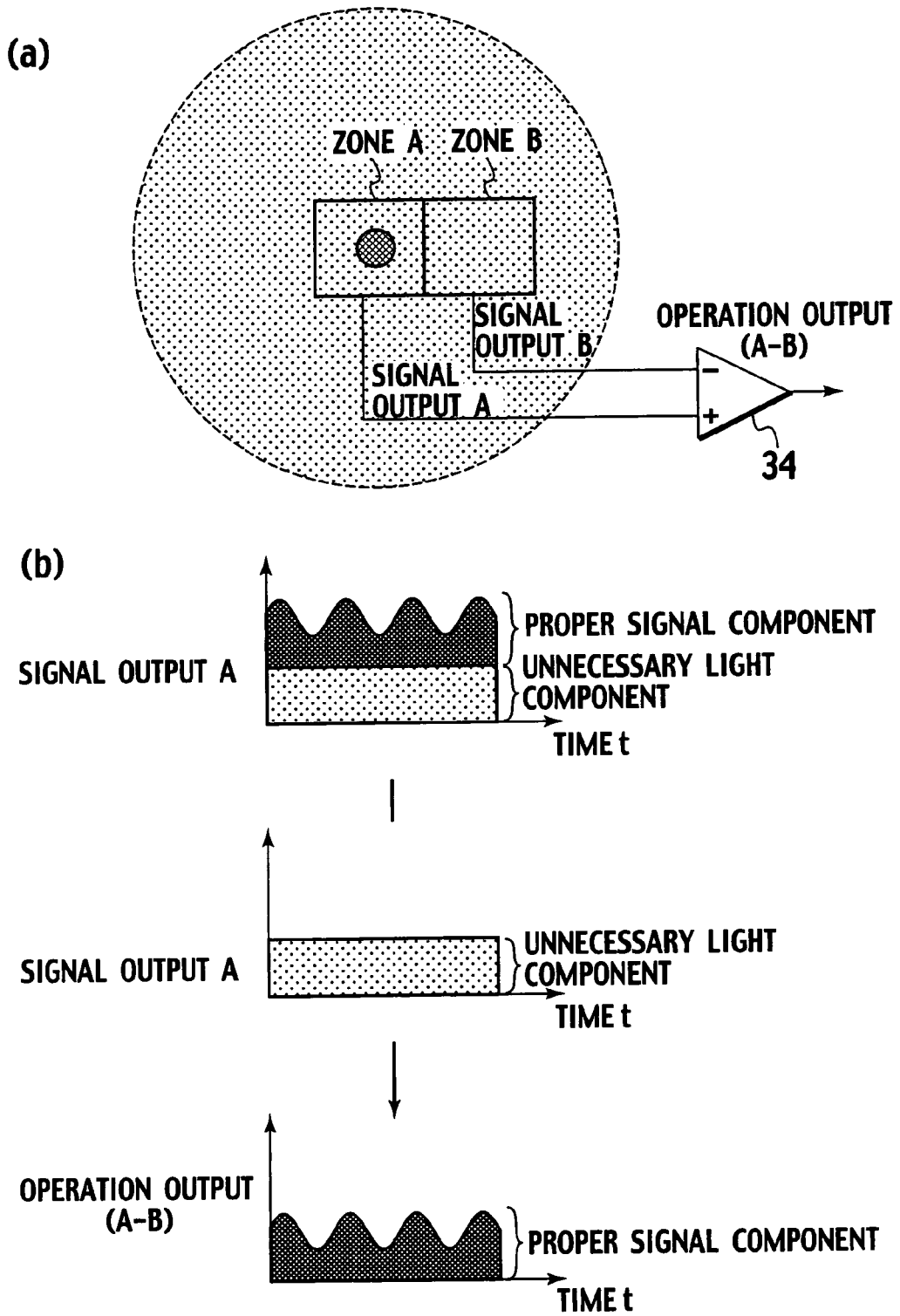
FIGS. 11(a) and 11(b) are plan and waveform views showing the principle of a measure to cope with an unnecessary beam in the optical device (when using a first-type optical disc)

FIG. 11(a) is a plan view showing a principle of a measure (for the first-type optical disk) to cope with unnecessary light in the optical device 9 and FIG. 11(b) shows related waveforms.

An irradiating state of unnecessary light will be studied. In FIG. 11(a), the first and second light receiving regions A and B have the same area and receive the same quantity of light When a beam of the first wavelength is used for reproduction, an output from the light receiving zone for a beam of the second wavelength that is not used for the first-wavelength reproduction may be subtracted from a main detection output by a subtracter 34 serving as an operation unit, to substantially completely remove an unnecessary light component from the detection signal as shown in FIG. 11(b).

When using the first-type optical disk, the optical device 9 may employ the subtracter 34 to provide an operation output of (A-B). Here, a detection output from the light receiving zone A for receiving a reflected sub-beam of the first wavelength is "A" and a detection output from the light receiving zone B for receiving a reflected sub-beam of the second wavelength is "B."

Figure 12:
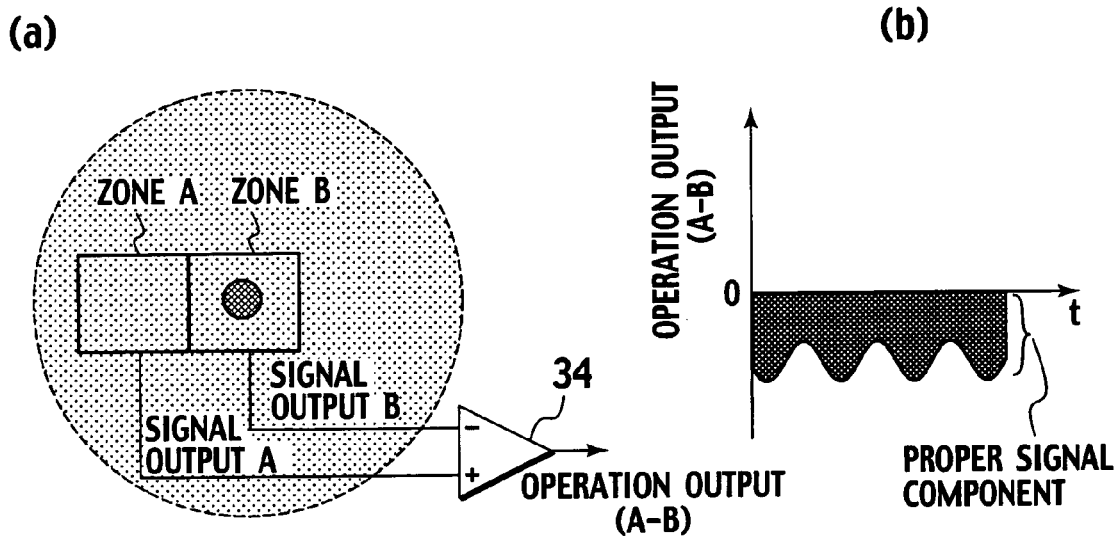
FIGS. 12(a) and 12(b) are plan and waveform views showing the principle of a measure to cope with an unnecessary beam in the optical device (when using a second-type optical disc)

FIG. 12(a) is a plan view showing a principle of a measure (for the second-type optical disk) to cope with unnecessary light in the optical device 9 and FIG. 12(b) shows a related waveform.

When using the second-type optical disk, the subtracter 34 provides an operation output (B-A) to remove an unnecessary light component.

Only by inverting the polarity of an operation output of the subtracter 34, an influence of unnecessary light can be avoided for both the first- and second-type optical disks.

The first light receiving zone A and second light receiving zone B are not limited to those for receiving reflected sub-beams. They may be those for receiving reflected main beams, the zones being divided depending on wavelengths to be used. In this case, the optical device 9 can avoid the influence of unnecessary light not only for reflected sub-beams but also for reflected main-beams.

The first light receiving zone to receive reflected light of the first wavelength and the second light receiving zone to receive reflected light of the second wavelength are substantially the same in the size of a light receiving area. This means that an intensity difference between incident beams of the different wavelengths is adjusted by adjusting the areas of the light receiving zones so that the intensity of received unnecessary light will be the same without regard to the wavelength thereof. The light receiving zones may have light receiving faces of different shapes if the areas of the light receiving faces are substantially equal to one another in consideration of intensity difference between incident light of the different wavelengths.

FIG. 13(a) is a plan view showing a structure to realize the measure to cope with unnecessary light in the optical device 9 and FIG. 13(b) shows a related waveform.

Figure 13:
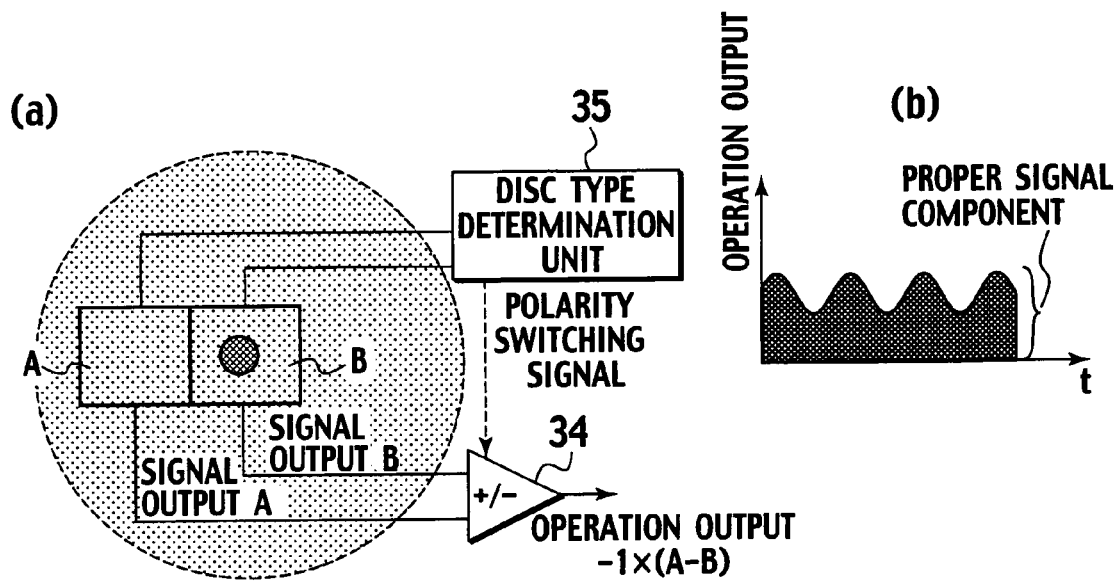
FIGS. 13(a) and 13(b) are plan and waveform views showing a configuration to realize the measure to cope with an unnecessary beam in the optical device.

As shown in FIG. 13, a disc type determination unit 35 is used as a wavelength determination unit to determine whether incident light has the first wavelength or the second wavelength and automatically invert the polarity of an operation output of the subtracter 34, thereby avoiding an influence of unnecessary light. A wavelength of incident light corresponds to a disc type, and therefore, determining a wavelength of incident light or determining a disc type provides the same result. The disc type determination unit 35 may be arranged on the light receiving element base 14.

Which of the wavelengths is used can be also determined by comparing light intensities in the light receiving regions A and B divided for the first and second wavelengths. If drivers for the first and second laser sources are arranged on the light receiving element base 14 on which the light receiving element is arranged, which of the wavelengths is used can be determined by finding which of laser source driving voltages is higher than the other.

According to a determination made by the disc type determination unit 35, a polarity switching signal is generated to switch the polarity of the subtracter 34. Without the use of external control, this configuration can obtain a correct detection output from either type of optical disc without the influence of unnecessary light. According to this configuration, the subtracter 34 is provided with a polarity switching unit that inverts the polarity of an operation output in response to a polarity switching signal provided by the disc type determination unit 35.

Figure 14:
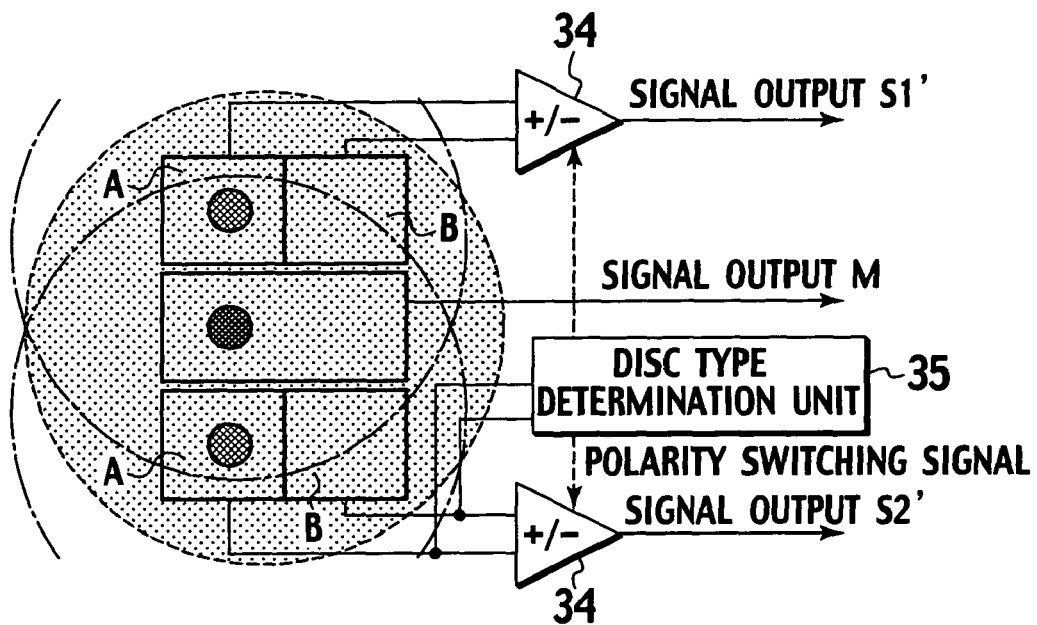
FIGS. 14(a) and 14(b) are plan and waveform views showing another configuration to realize the measure to cope with an unnecessary beam in the optical device.
Figure 14:
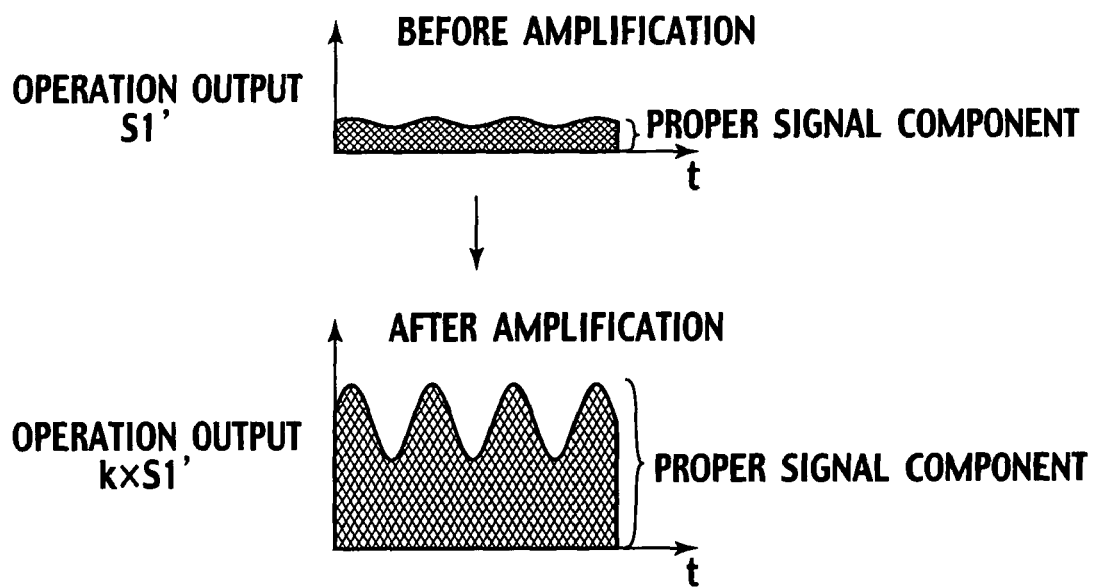

FIG. 14(*a*) is a plan view showing another configuration to realize the measure to cope with unnecessary light in the optical device 9 and FIG. 14(*b*) shows related waveforms.

For the optical discs mentioned above, the DPP (differential push-pull) method is used to generate three beams, receive reflected main and sub beams, and provide a tracking error signal.

To secure recording light power for a recordable optical disk (recordable DVD), the light quantity ratio of a sub-beam to main beam is usually set to a large value, for example, 1:10 up to 1:20, typically 1:16.

In this sort of optical system, even if the influence of an unnecessary light component on reflected main beams is ignorable, a flare caused by the main beams irradiates the light receiving zones for receiving reflected sub-beams. In this case, the flare that influences the reflected sub-beams has an intensity 10 to 20 times greater than that of the sub-beams.

Accordingly, detection outputs from reflected main beams may be provided without the use of the above-mentioned cancel signal so as to simplify a circuit system. Only for reflected sub-beams on which unnecessary light gives an unignorable influence, the above-mentioned cancel signal may be generated and used.

Only for the light receiving zones A and B to receive reflected sub-beams, adjacent light receiving zones of the same area are formed as shown in FIG. 14(*a*), and according to a difference between detection outputs of these light receiving zones, the influence of unnecessary light will be omitted. In FIG. 14(*b*), each of operation outputs S1' and S2' from the subtracters 34 is multiplied by a constant k, to provide operation outputs kS1' and kS2' having sufficient amplitudes.

As explained above, the optical device 9 according to the present invention can suppress the influence of unnecessary light on reflected sub-beams whose intensity is weak and reduce an offset without increasing the size of an operation circuit.

The structures of the hologram element 19 and light receiving element 12 of the optical device according to the present invention used to obtain a tracking error signal TE and focus error signal (FE) are not limited to those mentioned above. They may be replaced with any other known structures.

In the optical device 9, each of the first light receiving faces 20A and 20B and second light receiving faces 21A and 21B for receiving reflected main beams may be divided in parallel into three sections. When recording information to an optical disk, each three sections are sufficient to obtain a push-pull signal (SubPP), or a push-pull signal for a main beam used to find a tracking error signal (TE(DPP)) based on a differential push-pull method. When reproducing information from an optical disk according to a phase differential (DPD), it is necessary to divide each of the first light receiving faces 20A and 20B and second light receiving faces 21A and 21B for receiving reflected main beams into four sections in parallel.

Each of the first light receiving faces 20A and 20B and second light receiving faces 21A and 21B for receiving reflected main beams may be divided into a section to receive a reflected main beam of the first wavelength and a section to receive a reflected main beam of the second wavelength. In this case, each of the light receiving faces 20A, 20B, 21A and 21B is divided into six or eight light receiving regions.

The invention claimed is:

1. An optical device for an optical pickup apparatus for recording or reproducing information with respect to a first information recording medium having a plurality of recording layers and a second information recording medium having a single recording layer, the optical device comprising:
    a substrate;
    a hologram element to diffract
    a first main beam of a first wavelength that is reflected by a first one of the plurality of recording layers that is a recording or reproducing object in the plurality of recording layers of the first information recording medium, and
    first and second sub-beams of the first wavelength that are reflected by the first one of the plurality of recording layers of the first information recording medium so as to reach different positions, respectively, during recording or reproducing information to or from the first information recording medium, and
    a second main beam of a second wavelength that is reflected by the single recording layer of the second information recording medium, and
    third and fourth sub-beams of the second wavelength that are reflected by the single recording layer of the second information recording medium so as to reach different positions, respectively, during recording or reproducing information to or from the second information recording medium;
    a plurality of first light receiving regions arranged on the substrate to receive first and second diffracted beams that are diffracted from the first and second sub-beams respectively by the hologram element;
    a plurality of second light receiving regions arranged on the substrate to receive third and fourth diffracted beams that are diffracted from the third and fourth sub-beams respectively by the hologram element; and
    an operation unit, wherein:
    the wavelength of an incident beam to the hologram element is one wavelength of either the first or second wavelengths,
    the operation unit performs a subtraction operation between a signal that is photoelectrically converted from the light received by the plurality of first light receiving regions that receives the first and second diffracted beams and unnecessary light reflected by one or more of the plurality of first information medium recording layers other than the recording layer that is a recording or reproducing object and a signal that is photoelectrically converted from the light received by the plurality of second light receiving regions that receive the unnecessary light scattering over the substrate including the plurality of first and second light receiving regions reflected by one or more of the plurality of first information medium recording layers other than the recording layer that is the recording or reproducing object, the operation unit removes a component representative of the unnecessary light from the signal that is photoelectrically converted from the light received by the plurality of first light receiving regions, and the operation unit outputs a detection signal representative of the first light wavelength, when the one wavelength is the first wavelength, and wherein the operation unit:

performs a subtraction operation between a signal that is photoelectrically converted from the light received by the plurality of second light receiving regions that receive the third and fourth diffracted beams and unnecessary light reflected by the single recording layer of the second information recording medium and a signal that is photoelectrically converted from the light received by the plurality of first light receiving regions that receive unnecessary light scattering over the substrate including the plurality of first and second light receiving regions reflected by the single recording layer of the second information recording medium, removes a component representative of the unnecessary light from the signal that is photoelectrically converted from the light received by the plurality of second light receiving regions, and outputs a detection signal representative of the second light wavelength, when the one wavelength is the second wavelength.

2. The optical device as set forth in claim 1, wherein:

at least one of the plurality of first light receiving regions is adjacent to at least one of the plurality of second light receiving regions and the at least one adjacent first light receiving region has a light receiving area nearly equal to the light receiving area of the at least one adjacent second light receiving region.

3. The optical device as set forth in claim 1, comprising:

determination means for determining whether the wavelength of the incident beam is the first wavelength or the second wavelength, wherein the operation unit outputs the detection signal representative of the wavelength determined by the determination means.

4. The optical device as set forth in claim 1, wherein the hologram element is divided into first and second regions having different diffraction axes;

the plurality of first light receiving regions further comprises a third light receiving region to receive a diffracted beam from the first region of the hologram element and a fourth light receiving region to receive a diffracted beam from the second region of the hologram element; and the plurality of second light receiving regions further comprises a fifth light receiving region to receive a diffracted beam from the first region of the hologram element and a sixth light receiving region to receive a diffracted beam from the second region of the hologram element.

5. The optical device as set forth in claim 1, wherein the first wavelength is in a 650-nm band and the second wavelength is in a 780-nm band.

6. The optical device as set forth in claim 5, comprising:

a first light source for emitting light of the first wavelength; and a second light source for emitting light of the second wavelength.

7. The optical pickup apparatus as set forth in claim 6, comprising:

a first diffraction grating to divide light of the first wavelength from the first light source into a main beam and two sub-beams; and a second diffraction grating arranged in the optical device, to divide light of the second wavelength from the second light source into a main beam and two sub-beams.

8. The optical pickup apparatus of claim 6, comprising:

a first diffraction grating arranged in the optical device, to divide light of the first wavelength from the first light source into a main beam and two sub-beams; and a second diffraction grating to divide light of the second wavelength from the second light source into a main beam and two sub-beams.

9. The optical device as set forth in claim 1, wherein at least one of a first light source for emitting light of the first wavelength and a second light source for emitting light of the second wavelength is arranged on the substrate.

* * * * *